US009549084B2

(12) United States Patent
Imahira et al.

(10) Patent No.: US 9,549,084 B2
(45) Date of Patent: Jan. 17, 2017

(54) PHOTO DECORATION DEVICE

(71) Applicant: FURYU CORPORATION, Tokyo (JP)

(72) Inventors: Aki Imahira, Kyoto (JP); Tami Goya, Kyoto (JP); Tadao Hayakawa, Kyoto (JP); Sachiyo Kanazawa, Osaka (JP); Yoshiko Takemura, Kyoto (JP)

(73) Assignee: FURYU CORPORATION, Tokyo (JP)

( * ) Notice: Subject to any disclaimer, the term of this patent is extended or adjusted under 35 U.S.C. 154(b) by 0 days.

(21) Appl. No.: 14/454,434

(22) Filed: Aug. 7, 2014

(65) Prior Publication Data

US 2015/0124105 A1 May 7, 2015

(30) Foreign Application Priority Data

Aug. 9, 2013 (JP) ................................. 2013-166836

(51) Int. Cl.
*H04N 1/00* (2006.01)
*H04N 5/232* (2006.01)

(52) U.S. Cl.
CPC ...... *H04N 1/00167* (2013.01); *H04N 1/00164* (2013.01); *H04N 1/00244* (2013.01); *H04N 1/00265* (2013.01); *H04N 1/00289* (2013.01); *H04N 5/23216* (2013.01); *H04N 5/23229* (2013.01); *H04N 5/23293* (2013.01)

(58) Field of Classification Search
USPC .......................................................... 396/2
See application file for complete search history.

(56) References Cited

U.S. PATENT DOCUMENTS

| 6,148,148 | A | * | 11/2000 | Wain et al. ........................ 396/2 |
| 8,139,262 | B2 | * | 3/2012 | Hamashima et al. ......... 358/1.9 |
| 2003/0152376 | A1 | * | 8/2003 | Maeda et al. ..................... 396/2 |
| 2004/0028397 | A1 | * | 2/2004 | Maekawa et al. ................ 396/2 |
| 2004/0076414 | A1 | * | 4/2004 | Inage et al. ....................... 396/2 |
| 2007/0098368 | A1 | * | 5/2007 | Carley et al. ................... 386/96 |

(Continued)

FOREIGN PATENT DOCUMENTS

| JP | 2002-064726 A | 2/2002 |
| JP | 2003-123086 A | 4/2003 |

(Continued)

OTHER PUBLICATIONS

Oct. 29, 2015 Office Action issued in Japanese Application No. 2013-166836.

(Continued)

*Primary Examiner* — Clayton E LaBalle
*Assistant Examiner* — Dennis Hancock
(74) *Attorney, Agent, or Firm* — Oliff PLC

(57) ABSTRACT

A shooting processing section shoots a user as an object, and an editing processing section allows the user to edit a shot image obtained by shooting. An input receiving section receives, a plurality of times, selection of manipulation processing to be applied to the entire shot image, and a manipulation processing section generates, when the selection of manipulation processing has been received this time, an image after manipulation processing that is the entire shot image to which the manipulation processing received this time is applied over the manipulation processing, selection of which has been received previous time. The present invention can be applied to a photo sticker creating device, for example.

16 Claims, 29 Drawing Sheets

(56) References Cited

U.S. PATENT DOCUMENTS

| | | | | |
|---|---|---|---|---|
| 2011/0234779 A1* | 9/2011 | Weisberg | ............... | G03B 17/53 |
| | | | | 348/61 |
| 2011/0310111 A1* | 12/2011 | Cho | ...................... | G06T 11/001 |
| | | | | 345/582 |
| 2013/0188063 A1* | 7/2013 | Cameron | ............... | H04N 5/272 |
| | | | | 348/207.1 |
| 2013/0235070 A1* | 9/2013 | Webb | ....................... | G09G 5/02 |
| | | | | 345/594 |

FOREIGN PATENT DOCUMENTS

| | | |
|---|---|---|
| JP | A-2004-80549 | 3/2004 |
| JP | A-2004-349959 | 12/2004 |
| JP | A-2010-109651 | 5/2010 |
| JP | A-2013-207780 | 10/2013 |

OTHER PUBLICATIONS

May 17, 2016 Office Action issued in Japanese Application No. 2015-254990.

Oct. 20, 2016 Office Action issued in Japanese Patent Application No. 2015-254990.

* cited by examiner

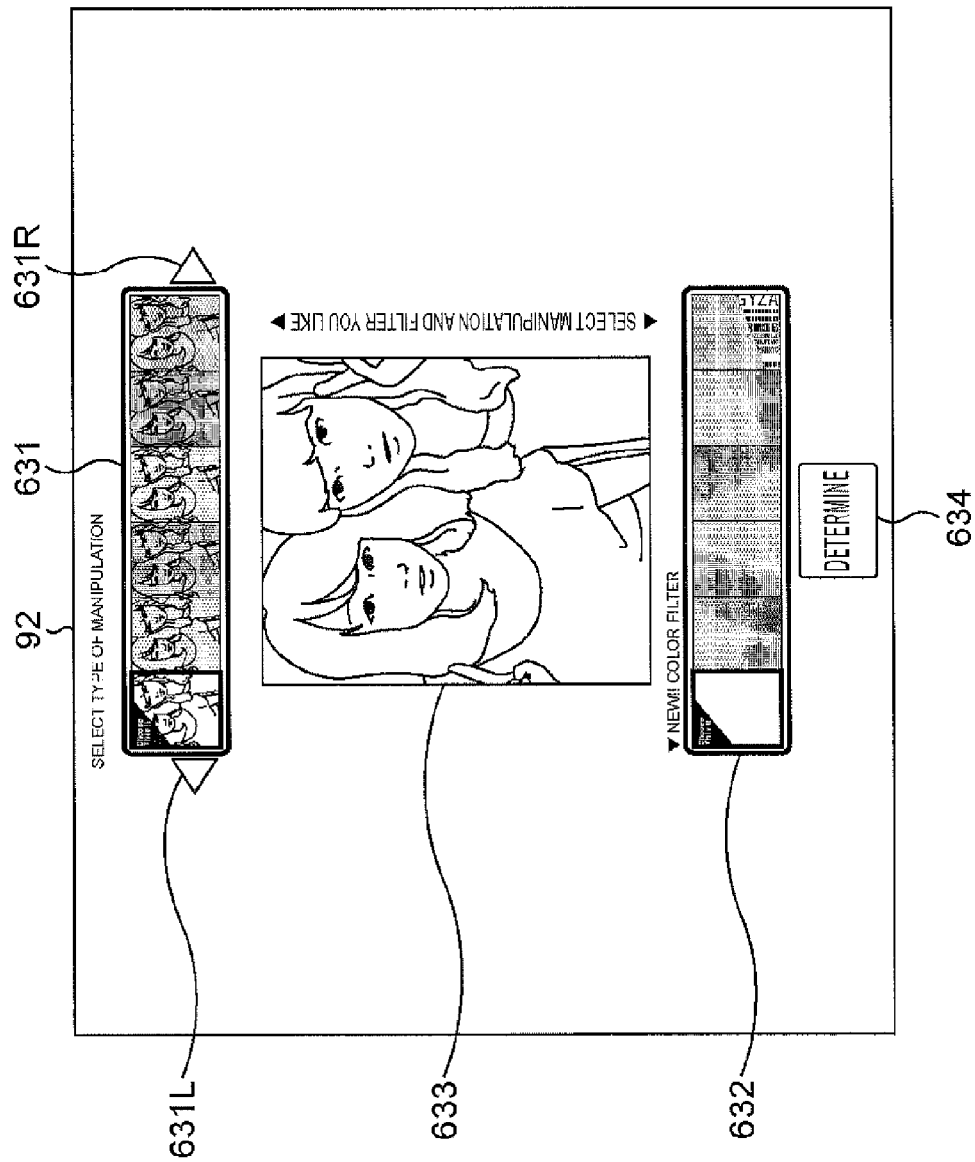

PHOTO DECORATION DEVICE

BACKGROUND

Technical Field

The present invention relates to a photo decoration device, and especially relates to a photo decoration device that allows a user to easily select manipulation content with high flexibility, and enables the user to easily imagine a finish after manipulation.

Related Art

Photo sticker machines that take photos of users, allow the user to edit images obtained by taking photos, print an image after editing on a sticker sheet, and provide the sticker sheet are known. Hereinafter, taking photographs of the users and obtaining images will be referred to as "shooting" or "shooting the users". Such photo sticker machines are installed in amusement (play) facilities, or the like. Main users of the photo sticker machines are females.

Among such photo sticker machines, there is one that displays, on an editing screen, a plurality of sample images to which images for compositing have been composited in advance, and a foreground color palette used by the user to select a color of a foreground image and a background color palette used by the user to select a color of a background image, of the images for compositing composited to the respective sample images (see JP 2010-109651 A).

Further, there is one that allows the user to perform adjustment of redness (a tone of the skin of an object), adjustment of brightness (whiteness of the skin of the object), and adjustment of sharpness in order to adjust a finish state of a shot image (see JP 2004-349959 A). On an adjustment screen for performing the adjustment, each adjustment state is marked in seven stages.

Further, there is one that varies two of four pieces of correction information: brightness, tone, contrast, and vividness of shot images, which are arrayed and displayed in a matrix manner, in stages into two directions of a vertical direction and a horizontal direction of an array, thereby to allow the user to select a shot image to which desired correction processing is applied.

SUMMARY

However, in a photo sticker machine of JP 2010-109651 A, only after selecting one model sample image, the user can change the color of an image for compositing composited to the model sample image. Further, the user cannot soon confirm a result of compositing of the image for compositing, which is composited to the selected model sample image, to the shot image. Therefore, the flexibility for selecting manipulation content of an image is low, and it is hard for the user to imagine the finish after manipulation.

Further, if only the adjustment state is marked in the seven stages, as described in the photo sticker machine of JP 2004-349959 A, it is hard for the user to imagine the finish after manipulation.

Further, in the case where the user is allowed to select a shot image subjected to desired correction processing from among shot images arranged and displayed in a matrix manner, the shot images having two pieces of correction information changed in stages into two directions, the user may hesitate about selecting which shot image subjected to correction processing, and it is hard for the user to determine manipulation content of the image.

The present invention has been made in view of the foregoing, and allows the user to easily select manipulation content with high flexibility and enables the user to easily imagine a finish after manipulation.

A photo decoration device of a first aspect of the present invention includes: a shooting processing section configured to shoot a user as an object; an editing processing section configured to allow the user to edit a shot image obtained by shooting; an input receiving section configured to receive, a plurality of times, selection of manipulation processing to be applied to the entire shot image; and a manipulation processing section configured to generate, when the selection of manipulation processing has been received this time, an image after manipulation processing that is the entire shot image to which the manipulation processing received this time is applied over the manipulation processing, selection of which has been received previous time.

The manipulation processing section may generate the image after manipulation processing to which variations of the manipulation processing, selection of which has been received, is applied.

The photo decoration device may further include a manipulation sample image display control section configured to display a manipulation sample image group made of a plurality of manipulation sample images that serve as samples of manipulation results of the manipulation processing, for each type of the manipulation processing, and the input receiving section may receive the selection of manipulation processing corresponding to the manipulation sample image selected in the manipulation sample image group.

The manipulation sample image display control section may display a non-manipulation sample image not corresponding to any of the manipulation processing, as one of the manipulation sample images in the manipulation sample image group, and the photo decoration device may further includes a background selection screen display control section configured to display a background selection screen for selecting a background image to be composited to a background area of the shot image when selection of the non-manipulation sample image has been received in all types of the manipulation sample image groups.

The manipulation sample image display control section may display a plurality of the manipulation sample images arranged in a predetermined direction in the manipulation sample image group with predetermined staging according to an operation of the user.

The manipulation processing may include at least one of processing of superimposing a layer image having predetermined texture and/or a predetermined color on an image, and processing of changing color information of a part of an image or an entire image.

The shooting processing section may shoot the user as an object in a shooting space, and the editing processing section may allow the user to edit the shot image in an editing space different from the shooting space.

The photo decoration device may further include a transmission processing section configured to transmit the image after manipulation processing to a mobile terminal through a server.

In the first aspect of the present invention, a user is shot as an object, editing by the user is performed with respect to a shot image obtained by shooting, selection of manipulation processing to be applied to the entire shot image is received a plurality of times, and when the selection of manipulation processing has been received this time, an image after manipulation processing that is the entire shot image to which the manipulation processing received this time is applied over the manipulation processing, selection of which has been received previous time, is generated.

A photo decoration device of a second aspect of the present invention includes: a shooting processing section configured to shoot a user as an object; an editing processing section configured to allow the user to edit a shot image obtained by shooting; a manipulation sample image display control section configured to display, as manipulation sample images that serve as samples of manipulation results of manipulation processing, which is applied to the entire shot image, the different manipulation sample images according to whether the shooting processing section has performed chroma key shooting for applying chroma key processing to the shot image; an input receiving section configured to receive, a plurality of times, selection of the manipulation processing corresponding to the selected manipulation sample image; and a manipulation processing section configured to generate, when the selection of the manipulation processing has been received this time, an image after manipulation processing that is the entire shot image to which the manipulation processing received this time is applied over the manipulation processing, selection of which has been received previous time.

The manipulation sample image display control section may display a non-manipulation sample image not corresponding to any of the manipulation processing, as one of the manipulation sample images when the shooting processing section has performed the chroma key shooting.

The manipulation processing section may apply the manipulation processing including processing of trimming an image with a predetermined shape to the entire shot image when the shooting processing section does not perform the chroma key shooting.

The manipulation sample image display control section may display a plurality of the manipulation sample images arranged in a predetermined direction with predetermined staging according to an operation of the user.

The manipulation processing may include at least one of processing of superimposing a layer image having predetermined texture and/or a predetermined color to an image, and processing of changing color information of a part of an image or an entire image.

The shooting processing section may shoot the user as an object in a shooting space, and the editing processing section may allow the user to edit the shot image in an editing space different from the shooting space.

The photo decoration device may further include a transmission processing section configured to transmit the image after manipulation processing to a mobile terminal through a server.

In the second aspect of the present invention, a user is shot as an object, editing by the user is performed with respect to a shot image obtained by shooting, different manipulation sample images are displayed according to whether chrome key shooting for applying chrome key processing to the shot image has been performed, as manipulation sample images that serve as samples of manipulation results of the manipulation processing, which is applied to the entire shot image, selection of manipulation processing is received corresponding to the selected manipulation sample image, a plurality of times, and when the selection of manipulation processing has been received this time, an image after manipulation processing that is the entire shot image to which the manipulation processing received this time is applied over the manipulation processing, selection of which has been received previous time, is generated.

A photo decoration device of a third aspect of the present invention includes: a shooting processing section configured to shoot a user as an object; an editing processing section configured to allow the user to edit a shot image obtained by shooting; an input receiving section configured to receive, a plurality of times, selection of manipulation processing to be applied to the entire shot image; and a manipulation processing section configured to generate, when the selection of manipulation processing has been received this time, an image after manipulation processing that is an entire live view image captured at shooting to which the manipulation processing received this time is applied over the manipulation processing, selection of which has been received previous time.

The manipulation processing may include at least one of processing of superimposing a layer image having predetermined texture and/or a predetermined color to an image, and processing of changing color information of a part of an image or an entire image.

The shooting processing section may shoot the user as an object in a shooting space, and the editing processing section may allow the user to edit the shot image in an editing space different from the shooting space.

The photo decoration device may further include a transmission processing section configured to transmit the image after manipulation processing to a mobile terminal through a server.

In the third aspect of the present invention, a user is shot as an object, editing by the user is performed with respect to a shot image obtained by shooting, selection of manipulation processing to be applied to the entire shot image is received a plurality of times, and when the selection of manipulation processing has been received this time, an image after manipulation processing that is an entire live view image captured at shooting to which the manipulation processing received this time is applied over the manipulation processing, selection of which has been received previous time, is generated.

According to the present invention, the user can easily select manipulation content with high flexibility, and can easily imagine a finish after manipulation.

BRIEF DESCRIPTION OF DRAWINGS

FIG. 29 is a diagram illustrating an example of a live view display screen.

DETAILED DESCRIPTION

Hereinafter, specific embodiments to which the present invention is applied will be described in detail with reference to the drawings.

[Configuration of Appearance of Photo Sticker Creating Device]

Figure 1:
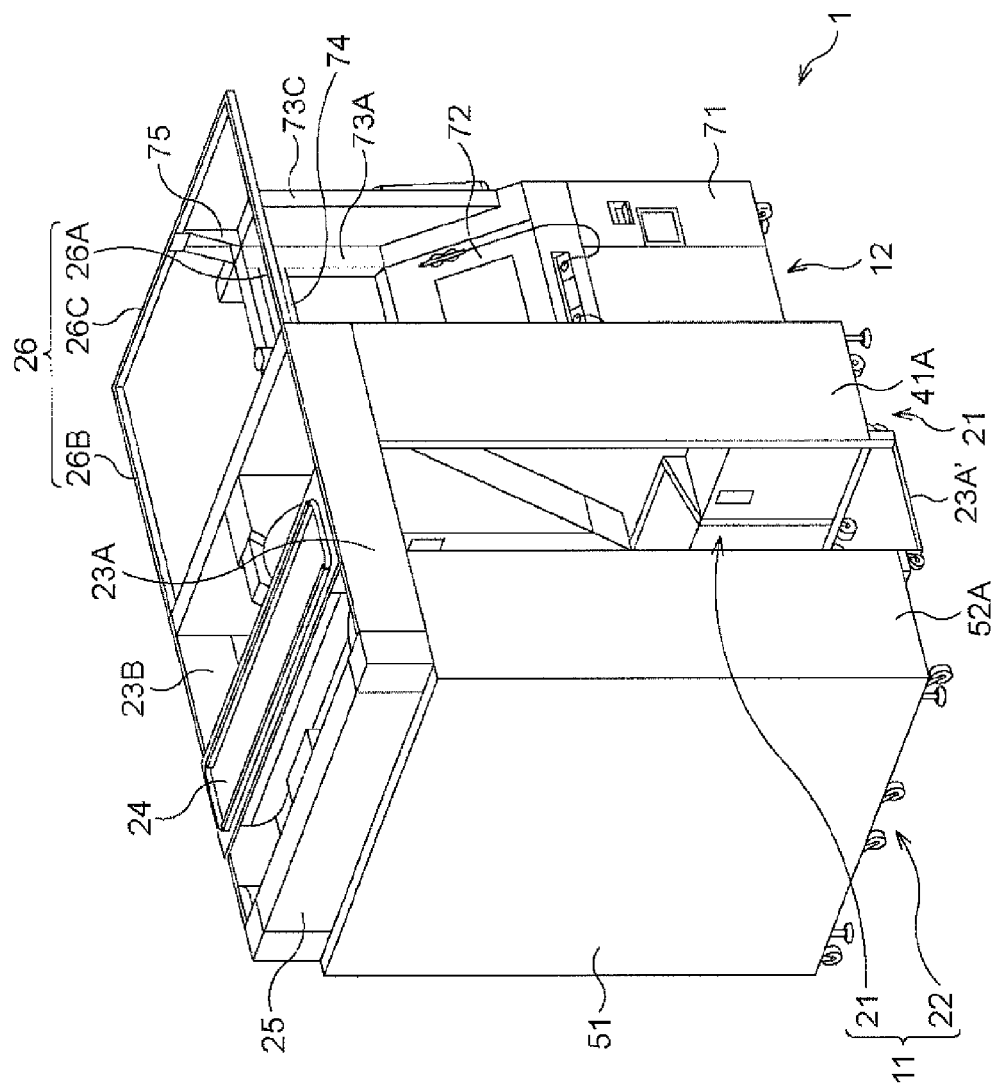
FIG. 1 is a perspective view illustrating a configuration example of an appearance of a photo sticker creating device according to an embodiment of the present invention.

FIG. 1 is a perspective view illustrating a configuration example of an appearance of a photo sticker creating device 1.

The photo sticker creating device 1 is a game device that provides a shot image and an edited image. The photo sticker creating device 1 provides an image by printing the image on a sticker sheet, or by making an image transmitted to a server browsable on a mobile terminal of the user. The photo sticker creating device 1 is installed in a shop such as a game arcade. The user may be a single person, or may be a plurality of persons, such as two or three persons.

The user herself/himself who plays with the photo sticker creating device 1 becomes an object and performs shooting. Then, the user edits an image selected from among shot images obtained by the shooting, by inputting handwritten characters or by compositing a stamp image prepared in advance in the photo sticker creating device 1, thereby to cause the shot image to be a colorful image. The user receives a sticker sheet on which the shot image and the edited image that is an image subjected to editing are printed, and terminates a series of a game.

As illustrated in FIG. 1, the photo sticker creating device 1 is basically configured such that a shooting unit 11 and an editing unit 12 are installed in a contact state.

The shooting unit 11 is configured from a shooting portion 21 and a background portion 22. The shooting portion 21 and the background portion 22 are installed being separated by a predetermined distance. A space formed between the shooting portion 21 and the background portion 22 becomes a shooting space in which shooting processing is performed.

Figure 3:
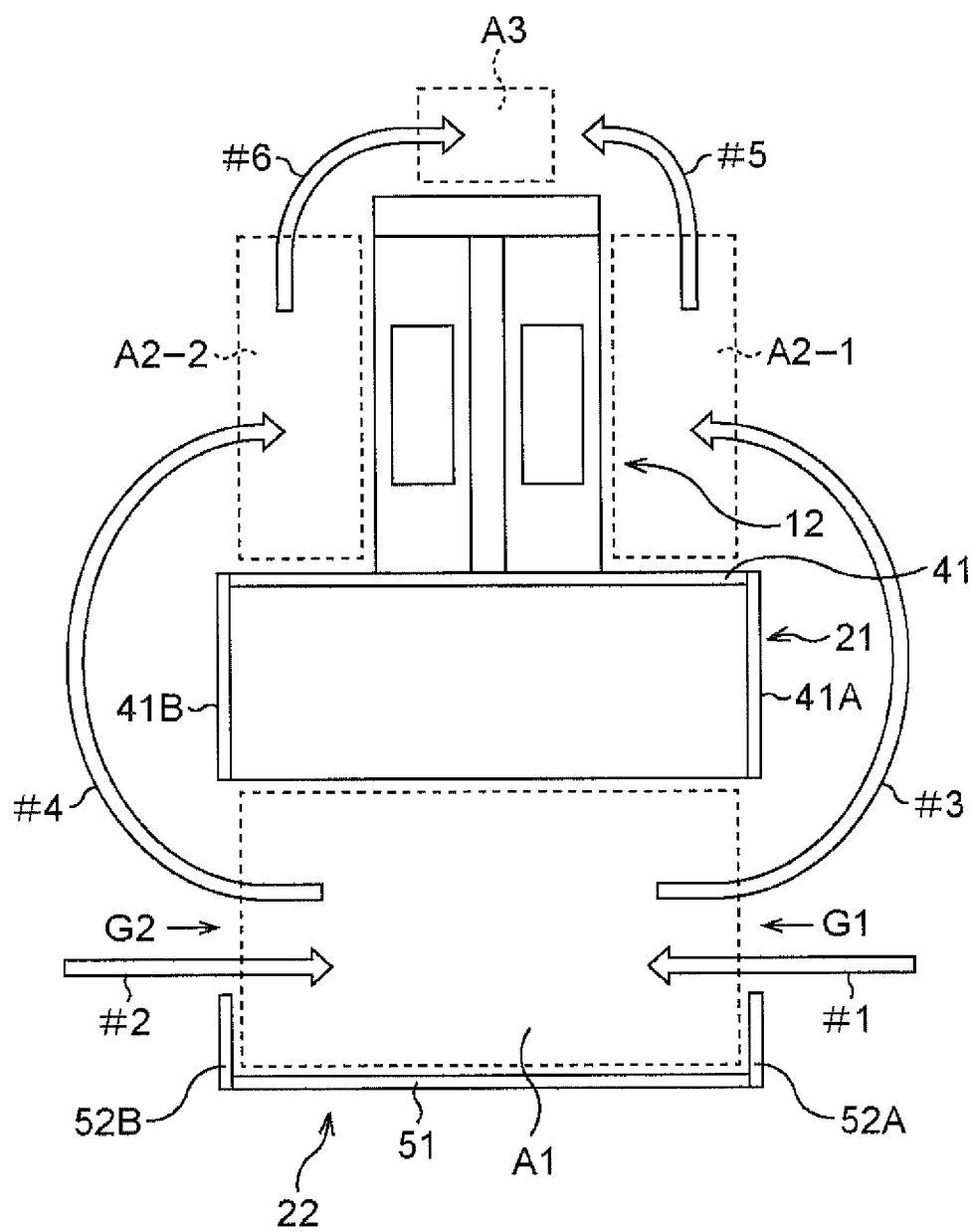
FIG. 3 is a diagram describing movement of a user.

The shooting portion 21 is a device for shooting the user as an object. The shooting portion 21 is positioned in front of the user who has entered the shooting space. A camera, a touch panel monitor used for an operation related to the shooting, and the like are provided in the front of the shooting portion 21 that faces the shooting space. When a surface of a right side as viewed from the user in the shooting space is a right side surface, and a surface of a left side is a left side surface, the right side surface of the shooting portion 21 is configured from a side surface panel 41A and the left side surface is configured from a side surface panel 41B (FIG. 3).

The background portion 22 is configured from a back surface panel 51, a side surface panel 52A, and a side surface panel 52B. The back surface panel 51 is a plate member positioned at a back surface side of the user who performs shooting, facing the front. The side surface panel 52A is a plate member having a narrower breadth than the side surface panel 41A, and attached to a right end of the back surface panel 51. The side surface panel 52B is a plate member having a narrower breadth than the side surface panel 41B, and attached to a left end of the back surface panel 51 (FIG. 3).

Figure 9:
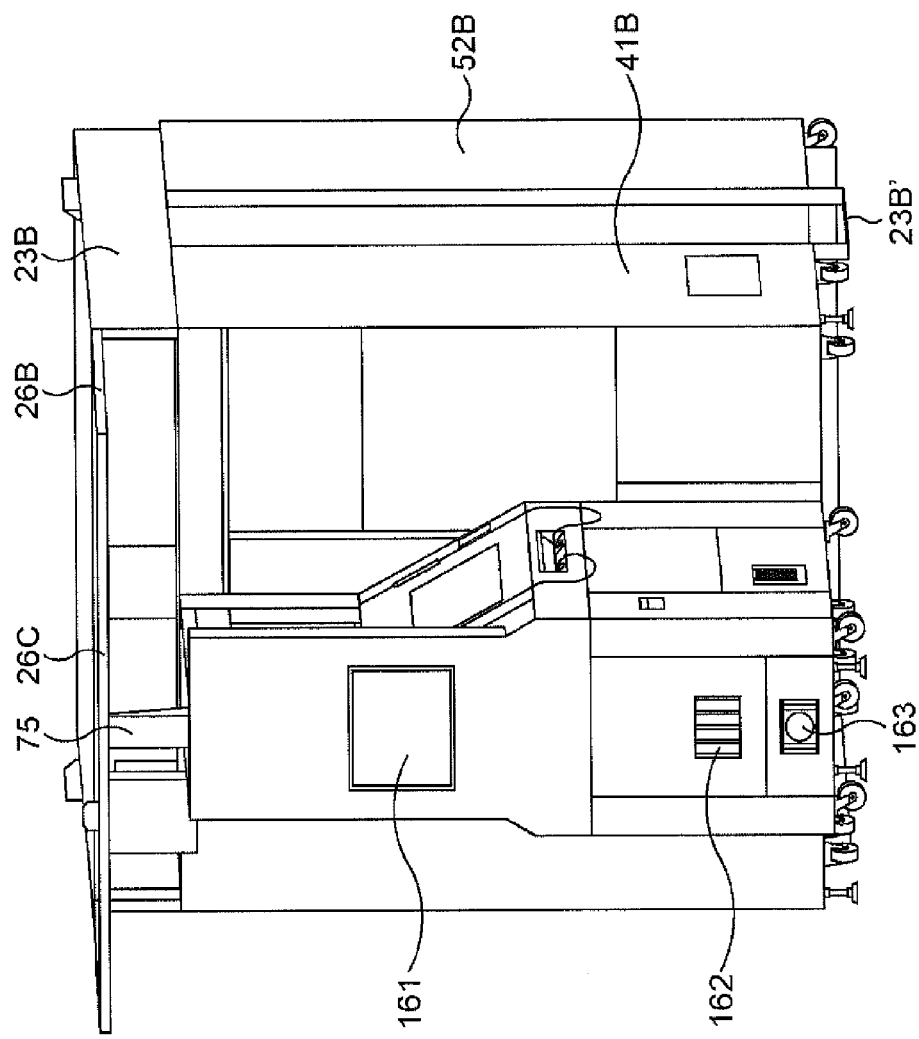
FIG. 9 is a diagram illustrating a configuration example of the right side surface of the editing unit.

The side surface panel 41A that configures the right side surface of the shooting portion 21 and the side surface panel 52A of the background portion 22 are provided in almost the same plane. Respective upper portions of the side surface panel 41A and the side surface panel 52A are coupled by a coupling portion 23A that is a plate member, and respective lower portions are coupled by a coupling portion 23A' that is a member made of a metal provided on a floor surface. The side surface panel 41B that configures the left side surface of the shooting portion 21 and the side surface panel 52B of the background portion 22 are similarly provided in almost the same plane, and respective upper portions are coupled by a coupling portion 23B and respective lower portions are coupled by a coupling portion 23B' (FIG. 9).

An opening formed by being surrounded by the side surface panel 41A of the shooting portion 21, the coupling portion 23A, and the side surface panel 52A of the background portion 22 becomes an entrance of the shooting space. Further, an opening formed by being surrounded by the side surface panel 41B of the shooting portion 21, the coupling portion 23B, and the side surface panel 52B of the background portion 22 also becomes an entrance.

A background curtain unit 25 is provided at an upper portion of the background portion 22 in the form of being supported by the back surface panel 51, the side surface panel 52A, and the side surface panel 52B.

Figure 6:
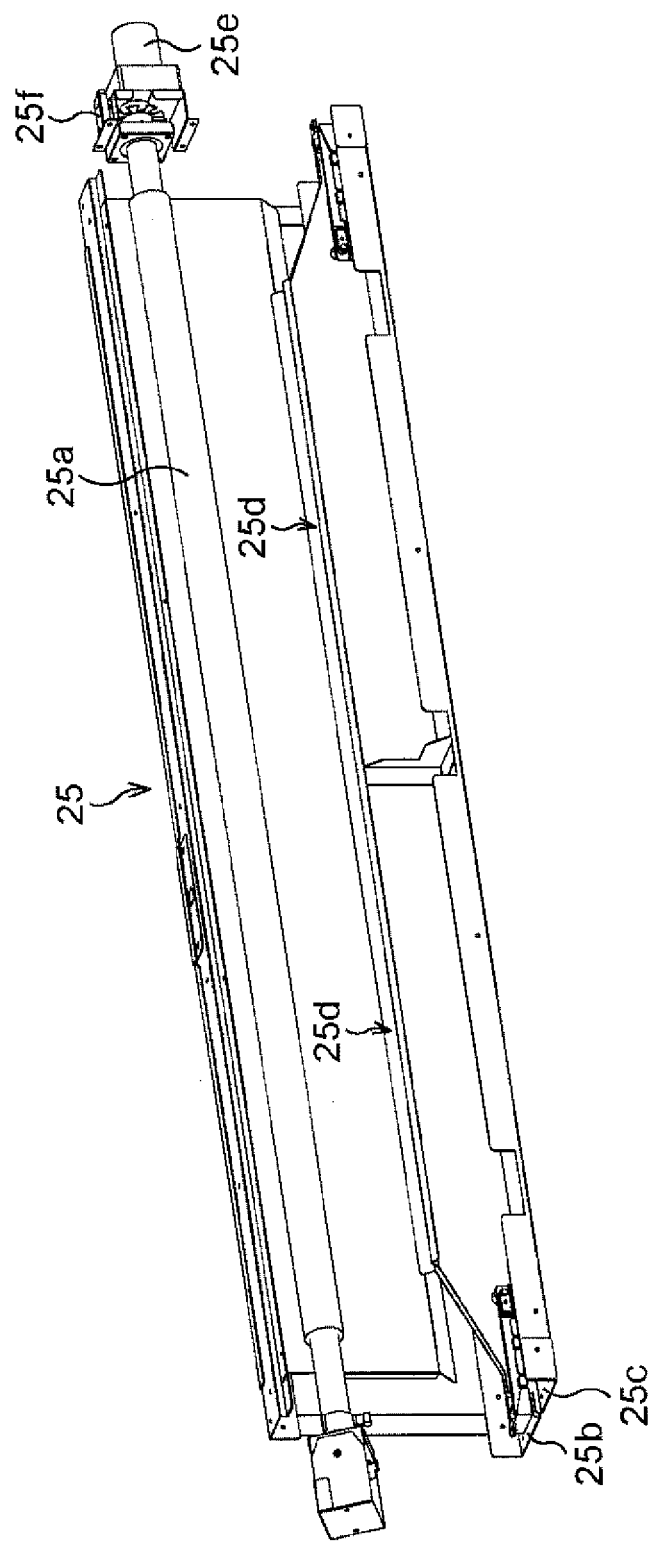
FIG. 6 is a diagram describing a structure of a background curtain unit.

FIG. 6 is a diagram describing a structure of the background curtain unit 25.

In the background curtain unit 25, a background curtain of a predetermined color, which appears in the background of the user in the shot image obtained by the shooting, is housed in a state of being wound around a shaft 25a. A slit 25d is provided between a member 25b and a member 25c that configure a lower side of the background curtain unit 25. The background curtain wound by the shaft 25a is lowered in the shooting space through the slit 25d by rotation of the shaft 25a by a motor 25e provided at an end of the shaft 25a. An illuminance sensor 25f is provided above the motor 25e.

The illuminance sensor 25*f* measures illuminance in a direction of the shaft 25*a* in the background curtain unit 25. In the background curtain unit 25, whether the background curtain has been completely wound by the shaft 25*a* is determined according to the illuminance measured by the illuminance sensor 25*f*.

The background curtain unit 25 appropriately lowers a green curtain for performing chroma key compositing (hereinafter, referred to as chroma key curtain) in the shooting space in conjunction with the shooting. Raising and lowering of the background curtain by the background curtain unit 25 is sometimes performed or sometimes not performed according to a shooting course selected by the user.

Note that the chroma key curtain may be affixed to the back surface panel 51 in advance, which is a back surface of the shooting space, without providing the background curtain unit 25. When the shooting is performed using the chroma key curtain as the background, a plurality of types of background images is prepared, and chroma key processing is performed in shooting processing or editing processing. In this way, the user can composite a desired background image on a portion of the curtain.

An opening surrounded by the front of the shooting portion 21, the coupling portion 23A, the coupling portion 23B, and the background curtain unit 25 is formed above the shooting space, and a ceiling strobe unit 24 is provided to cover a part of the opening. One end of the ceiling strobe unit 24 is fixed to the coupling portion 23A, and the other end is fixed to the coupling portion 23B. The ceiling strobe unit 24 incorporates a strobe that irradiates an inside of the shooting space with light in accordance with the shooting. A fluorescent light is provided in an interior of the ceiling strobe unit 24, in addition to the strobe, and also functions as illumination of the shooting space.

The editing unit 12 is a device for editing the shot image. The editing unit 12 is provided, being coupled with the shooting unit 11, such that one side surface comes in contact with the back surface of the shooting portion 21.

Configurations used for editing are respectively provided at a front surface side and a back surface side of the editing unit 12 so that two pairs of users can perform editing at the same time, where the configuration of the editing unit 12, a part of which can be seen in FIG. 1, is the configuration of the front surface side.

Figure 2:
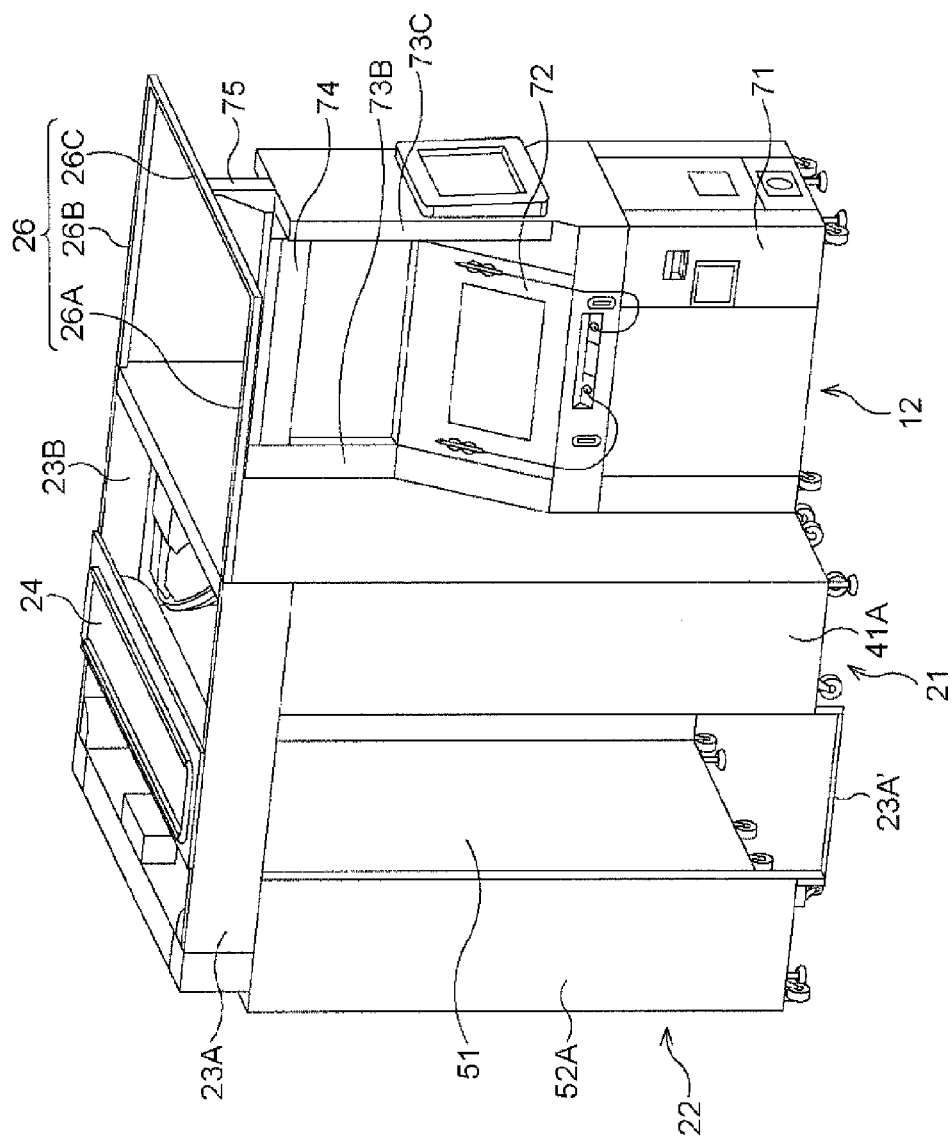
FIG. 2 is a perspective view of the appearance of the photo sticker creating device as viewed from another angle.

The front surface side of the editing unit 12 is configured from a surface 71, and a slope surface 72. The surface 71 is a surface vertical to the floor surface and is a surface nearly parallel to the side surface panel 41A of the shooting portion 21. The slope surface 72 is formed above the surface 71. On the slope surface 72, a configuration used for editing work is provided. On the right side of the slope surface 72, a columnar supporting portion 73A that supports one end of the illumination device 74 is provided. On the left side of the slope surface 72, a columnar supporting portion 73B that supports the other end of the illumination device 74 is provided (FIG. 2). On the right side of the supporting portion 73A, a plate-like panel 73C that configures a side surface of the editing unit 12 is provided. On an upper surface of the panel 73C, a supporting portion 75 that supports the curtain rail 26 is provided.

A curtain rail 26 is attached above the editing unit 12. The curtain rail 26 is configured by combining of three rails 26A to 26C such that the shape of the three rails 26A to 260 as viewed from above becomes a U shape. One ends of the rails 26A and 26B provided in parallel are fixed to the coupling portion 23A and the coupling portion 233, respectively, and both ends of the rail 260 are joined to the other ends.

A curtain is attached to the curtain rail 26 so that interiors of a space in front of the front surface of the editing unit 12 and a space in front of the back surface of the editing unit 12 cannot be seen from an outside. The space in front of the front surface of the editing unit 12 and the space in front of the back surface of the editing unit 12 surrounded by the curtain attached to the curtain rail 26 become editing spaces in which the user edits the shot image.

FIG. 2 is another perspective view of the photo sticker creating device 1.

Although to be described in detail, a tablet built-in monitor and an outlet through which a printed sticker sheet is discharged are provided in a right side surface of the editing unit 12. The tablet built-in monitor provided on the side surface of the editing unit 12 is used when the user who waits for completion of printing of an image uses a post-service function that is a function provided after the shooting and editing. The post-service function includes a function to transmit the shot image and the edited image to the server, a function of mini game, and the like. A space in front of the right side surface of the editing unit 12 becomes a post-service space where the user uses the post-service function.

Here, a flow of a photo sticker creation game and movement of the user associated with the game will be described.

FIG. 3 is a plan view of the photo sticker creating device 1 as viewed from above.

The user of the photo sticker creating device 1 enters a shooting space A1 formed between the shooting portion 21 and the background portion 22 from an entrance G1 as illustrated by an outline arrow #1, or from an entrance G2 as illustrated by an outline arrow #2, and shooting by a camera is performed a plurality of times by use of a touch panel monitor provided in the shooting portion 21. The entrance G1 is an opening between the side surface panel 41A and the side surface panel 52A, and the entrance G2 is an opening between the side surface panel 41B and the side surface panel 52B.

The user who has completed the shooting goes out of the shooting space A1 through the entrance G1 as illustrated by an outline arrow #3, and moves to an editing space A2-1, or goes out of the shooting space A1 through the entrance G2 as illustrated by an outline arrow #4, and moves to an editing space A2-2.

The editing space A2-1 is an editing space of the front surface side of the editing unit 12, and the editing space A2-2 is an editing space of the back surface side of the editing unit 12. Whether the user should move to either the editing space A2-1 or the editing space A2-2 is guided to the user by screen display of the touch panel monitor of the shooting portion 21. For example, a free space of the two editing spaces is guided to the user as a destination. The user who has moved to the editing space A2-1 or the editing space A2-2 starts editing work. As described above, with the two editing spaces, two pair of users, the user in the editing space A2-1, and the user in the editing space A2-2 can perform editing work at the same time.

After completion of the editing, printing of the shot images or the edited images is started. During the printing of the images, the user who has completed the editing in the editing space A2-1 moves from the editing space A2-1 to a post-service space A3 as illustrated by an outline arrow #5, and uses the post-service function. The user who has completed the editing in the editing space A2-2 moves from the editing space A2-2 to a post-service space A3 as illustrated by an outline arrow #6, and uses the post-service function.

When the printing of the images has been completed, the user receives a sticker sheet through the outlet provided in the right side surface of the editing unit 12, and completes a series of the photo sticker creation game.

Next, configurations of respective units and portions will be described.

[Configuration of Shooting Portion]

Figure 4:
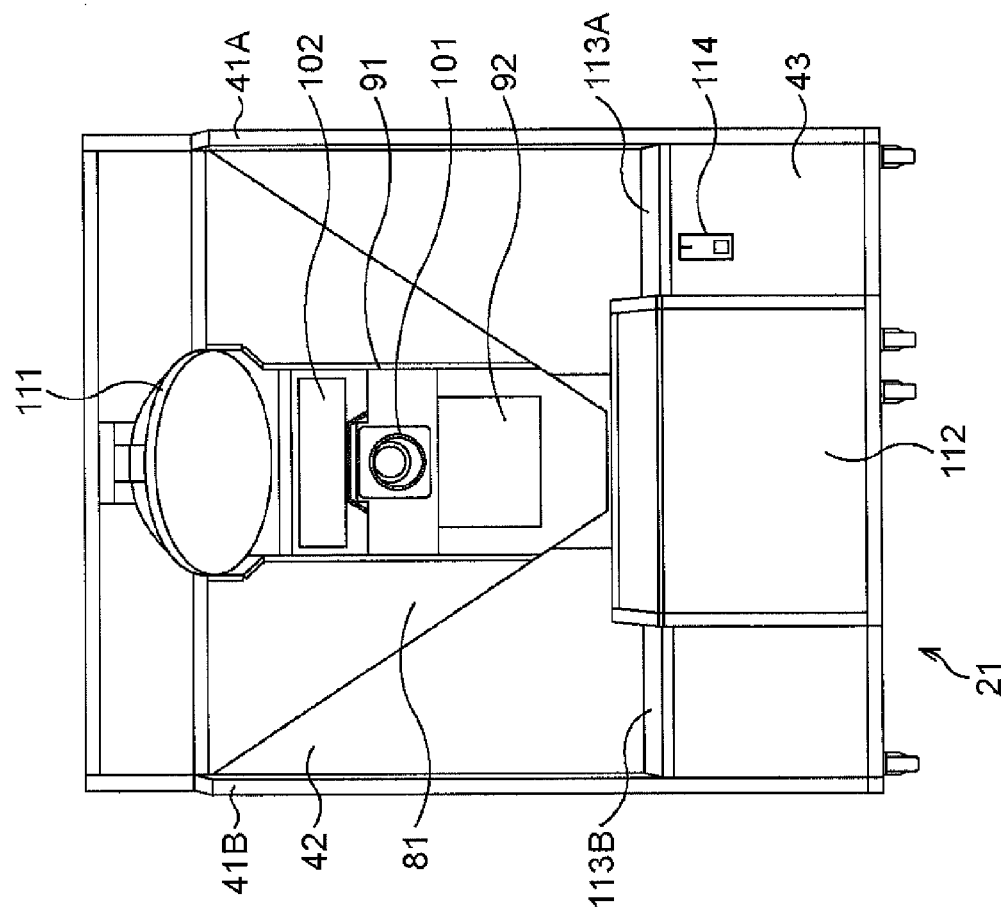
FIG. 4 is a diagram illustrating a configuration example of a shooting portion.

FIG. 4 is a diagram illustrating a configuration example of a front of the shooting portion 21. The shooting portion 21 is configured such that the side surface panel 41A, the side surface panel 413, and a front panel 42 are attached to a base portion 43 having a box like shape.

A protruding portion 81, which has a surface that is an upside-down isosceles trapezoid with a ratio of an upper base:a lower base being approximately 1:5, and the length of the lower base being the same as the breadth of the front panel 42, is formed on the center of the front panel 42. A camera unit 91 is provided approximately in the center of the protruding portion 81, and a touch panel monitor 92 is provided below the camera unit 91. The camera unit 91 is configured from a camera 101 and a front strobe 102.

The camera 101 is, for example, a single-lens reflex camera, and is attached to an interior of the camera unit 91 such that a lens is exposed. The camera 101 includes an imaging device such as a charge coupled device (CCD), and shoots the user in the shooting space A1. A moving image captured by the camera 101 is displayed in the touch panel monitor 92 in real time. A still image captured by the camera 101 at predetermined timing such as when the shooting is instructed by the user is stored as a shot image.

The front strobe 102 provided above the camera 101 includes a laterally long rectangular light-emitting surface formed of a milky white acrylic plate. The front strobe 102 emits light in accordance with the shooting with the camera 101, thereby to irradiate the vicinity of a face of the user as an object from the front.

Note that, as the milky white acrylic plate provided as the light-emitting surface of the front strobe 102, one having a high degree of transparency is used. Accordingly, the degree of diffusion of light by the light emission of the front strobe 102 can be suppressed, compared with a case of using one having a low degree of transparency as the milky white acrylic plate, and the user can be irradiated with a larger amount of light.

The touch panel monitor 92 provided below the camera unit 91 is configured from a monitor such as a liquid crystal display (LCD), and a touch panel layered thereto. The touch panel monitor 92 has a function as a live view monitor that displays a moving image captured by the camera 101, and a function to display various graphical user interfaces (GUIs) and to receive a selection operation of the user. The moving image (live view) and the shot image captured by the camera 101 are displayed in the touch panel monitor 92.

An upper strobe 111, a curved light-emitting surface of which faces the user, is installed above the camera unit 91. The upper strobe 111 emits light in accordance with the shooting by the camera 101, thereby irradiating the user from above.

A foot strobe 112 that irradiates the lower half of the body and the foot of the user is provided in the center of the base portion 43, and a coin insertion/return slot 114 through which the user inserts coins is provided in a right side of a vertical surface of the foot strobe 112.

Spaces 113A and 113B are formed at right and let portions on an upper surface of the base portion 43. The spaces 113A and 113B are formed to interpose an upper surface of the foot strobe 112. The spaces 113A and 113B are used as baggage storage places where the user who performs the shooting places hand baggage, and the like. A speaker that outputs voice guidance of the shooting processing, background music (BGM), a sound effect, and the like is provided in the vicinity of the ceiling of the front panel 42.

[Configuration of Background Portion]

Figure 5:
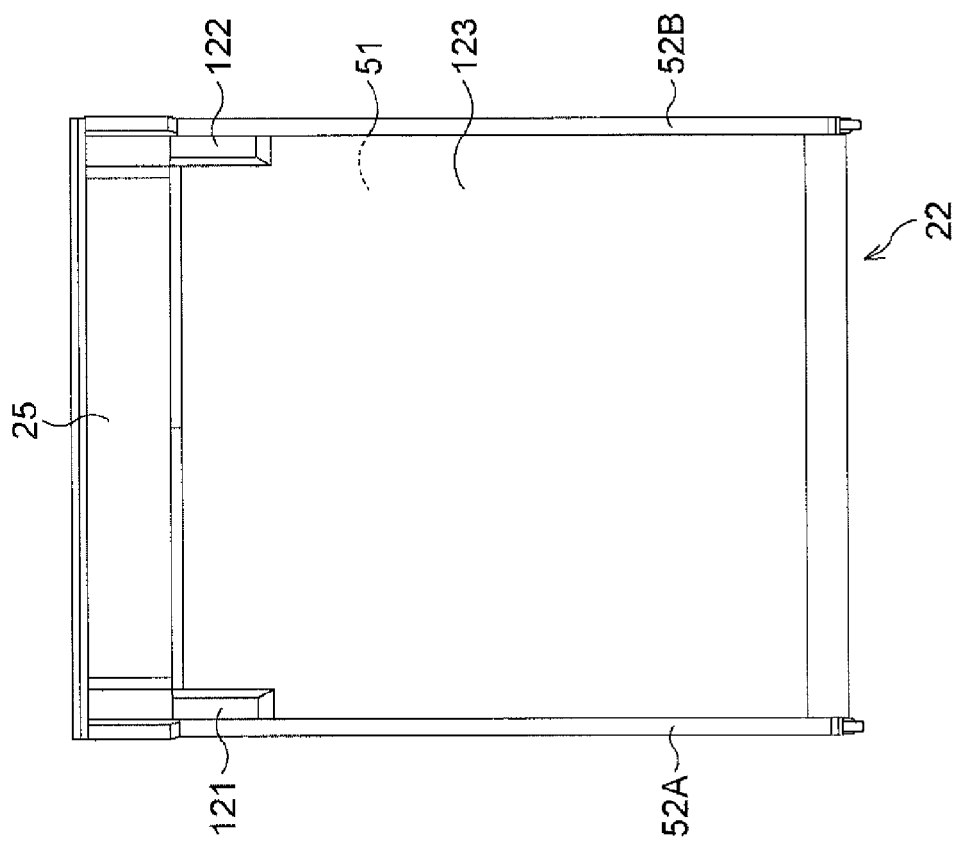
FIG. 5 is a diagram illustrating a configuration example of a background portion.

FIG. 5 is a diagram illustrating a configuration example of a shooting space A1 side of the background portion 22.

As described above, the background curtain unit 25 is provided above the back surface panel 51.

A back surface right strobe 121 that irradiates the user who performs the shooting processing in the shooting space A1 from a rear right side is attached above the back surface panel 51 on an entrance G1 side the left side in the drawing). Further, aback surface left strobe 122 that irradiates the user who performs the shooting processing in the shooting space A1 from a rear left side is attached above the back surface panel 51 on an entrance G2 side (the right side in the drawing).

Further, a back surface curtain 123 is affixed to a surface of the back surface panel 51 on a shooting space A1 side (the front side in the drawing). The color of the back surface curtain 123 is a white-based color, similarly to studios and the like where shooting of models of fashion magazines and the like is performed. Accordingly, a shadow more easily appears in the background of the object, and stereoscopic effects can be emphasized, in the shot image obtained by the shooting. Here, the white-based color includes not only white but also colors close to white (to be specific, gray close to white, bluish gray close to white, and the like).

In the photo sticker creation game by the photo sticker creating device 1 of the present invention, shooting for applying chroma key processing and shooting not applying the chroma key processing are performed, as described below. Therefore, the color of the back surface curtain 123 and the color of the chroma key curtain are made different, whereby shooting that suits each purpose can be performed.

[Configuration of Editing Unit]

Figure 7:
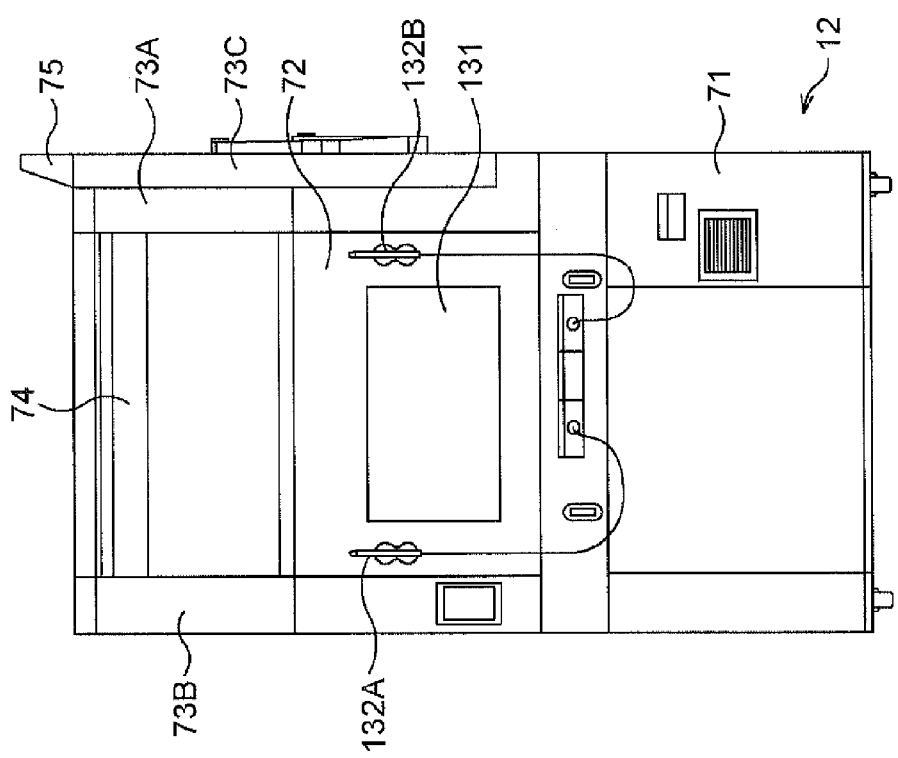
FIG. 7 is a diagram illustrating a configuration example of an editing unit.

FIG. 7 is a diagram illustrating a configuration example of the front surface side (an editing space A2-1 side) of the editing unit 12.

A tablet built-in monitor 131 is provided in a near center of the slope surface 72. A touch pen 132A is provided on the left side, and a touch pen 132B is provided on the right side, interposing the tablet built-in monitor 131.

The tablet built-in monitor 131 is configured such that a tablet into which an operation input can be performed using the touch pen 132A or the touch pen 132B is superimposed on a monitor such as an LCD. An editing screen is displayed in the tablet built-in monitor 131, for example. The editing screen is a screen used for editing of the shot image. When editing work is simultaneously performed by two persons, the touch pen 132A is used by the user who stands on the left side facing the tablet built-in monitor 131, and the touch pen 132B is used by the user who stands on the right side facing the tablet built-in monitor 131.

Figure 8:
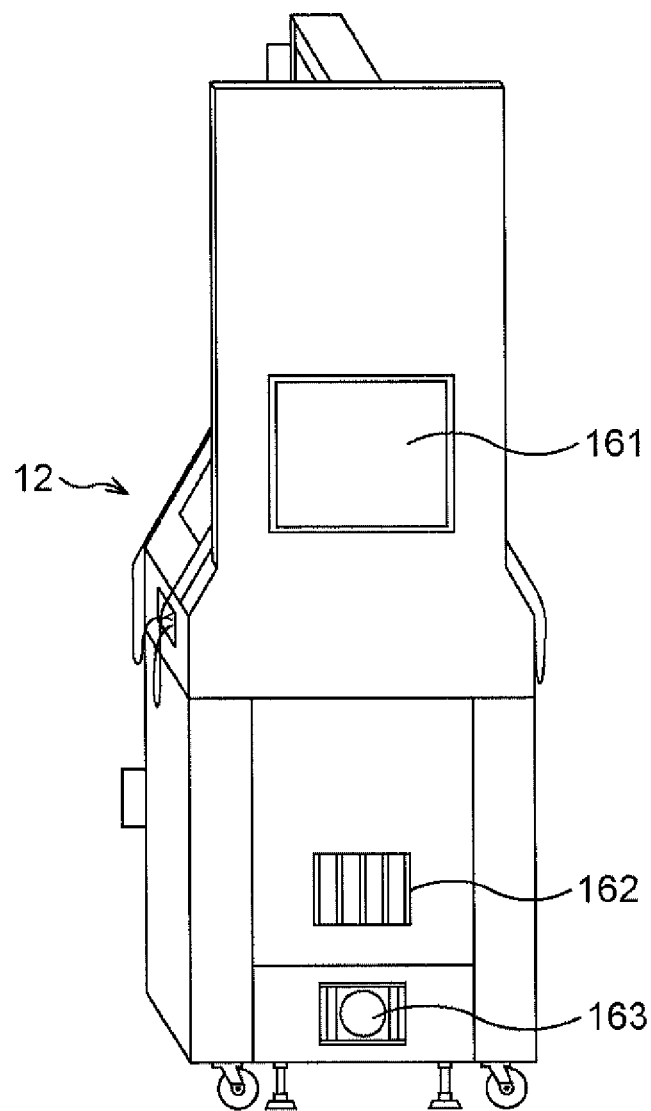
FIG. 8 is a diagram illustrating a configuration example of a right side surface of the editing unit.

FIGS. 8 and 9 are diagrams illustrating configuration examples of the right side surface of the editing unit 12.

A tablet built-in monitor 161 is provided on the right side surface of the editing unit 12. A screen used when the user uses the post-service function is displayed in the tablet built-in monitor 161.

A sticker sheet outlet 162 is provided below the tablet built-in monitor 161. A printer is provided in an interior of the editing unit 12. Images in which the user in the editing space A2-1 appears, or images in which the user in the editing space A2-2 appears are printed on a sticker sheet, with a predetermined layout, and the sticker sheet is discharged through the sticker sheet outlet 162. A speaker 163 that outputs voice guidance, BGM, a sound effect, and the like, which realizes the post-service function, is provided below the sticker sheet outlet 162.

[Internal Configuration of Photo Sticker Creating Device]

Figure 10:
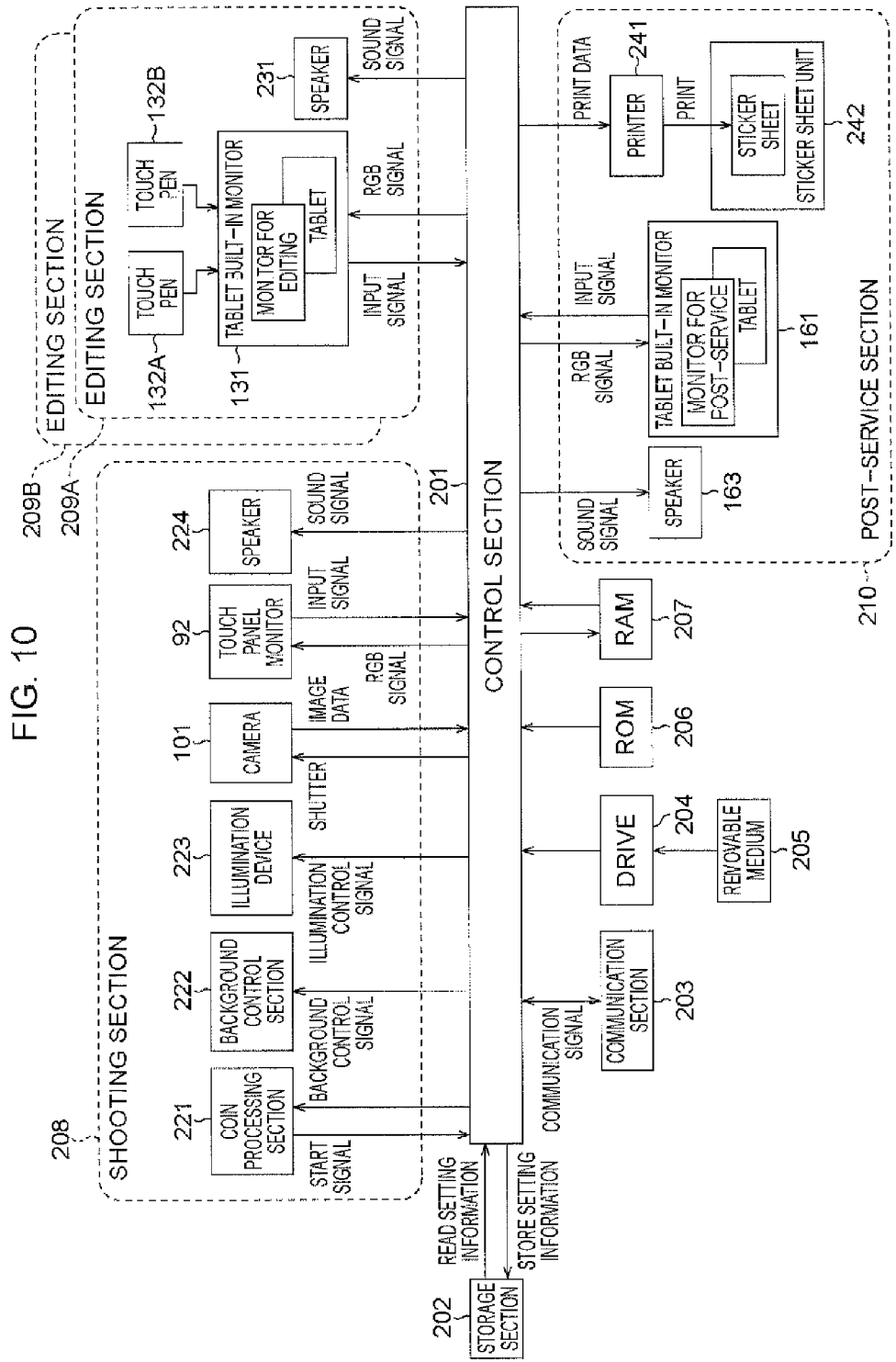
FIG. 10 is a block diagram illustrating an internal configuration example of the photo sticker creating device.

FIG. 10 is a block diagram illustrating an internal configuration example of the photo sticker creating device 1. The same configuration as the above-described configuration is denoted with the same reference sign. Overlapping description is appropriately omitted.

A control section 201 is formed of a central processing unit (CPU), and the like, and executes a program stored in read only memory (ROM) 206 or a storage section 202 to control the entire operation of the photo sticker creating device 1. The storage section 202, a communication section 203, a drive 204, the ROM 206, and a random access memory (RAM) 207 are connected to the control section 201. Configurations of a shooting section 208, an editing section 209A, an editing section 209B, and a post-service section 210 are also connected to the control section 201.

The storage section 202 is formed of a non-volatile storage medium, such as a hard disk or flash memory, and stores various types of setting information supplied from the control section 201, and the like. The information stored in the storage section 202 is appropriately read by the control section 201.

The communication section 203 is an interface of a network, such as the Internet, and performs communication with an external device according to the control by the control section 201. The communication section 203 transmits the shot image and the edited image to the server. An image transmitted from the communication section 203 is allocated a storage area of a predetermined URL and stored in the server, and is displayed in a display of an accessed mobile terminal. In this way, the image provided to the mobile terminal is sometimes used as a standby screen of the mobile terminal, sometimes exchanged with friends, or sometimes posted to a site that provides a service (may also be called community) to report a current status, such as a social networking service (SNS) or a blog.

A removable medium 205 formed of an optical disk or semiconductor memory is appropriately attached to the drive 204. A computer program and data read from the removable medium 205 by the drive 204 is supplied to the control section 201, and is sometimes stored or is sometimes installed in the storage section 202.

A program executed in the control section 201 and data are stored in the ROM 206. The RAM 207 temporarily stores the data and the program processed by the control section 201.

The shooting section 208 performs shooting processing intended for the user in the shooting space A1. The shooting section 208 is configured from a coin processing section 221, a background control section 222, an illumination device 223, the camera 101, the touch panel monitor 92, and a speaker 224.

The coin processing section 221 detects insertion of a coin to the coin insertion/return slot 114. When having detected insertion of coins of a predetermined amount of money such as 400 yen, the coin processing section 221 outputs a start signal that indicates the fact of the insertion to the control section 201.

The background control section 222 controls raising and lowering of the background curtain (chroma key curtain) by the background curtain unit 25 according to a background control signal supplied from the control section 201.

The illumination device 223 includes strobes in the shooting space A1, and emits light according to an illumination control signal supplied from the control section 201. The front strobe 102, the upper strobe 111, and the foot strobe 112 of the shooting portion 21, and the back surface right strobe 121 and the back surface left strobe 122 of the background portion 22 are provided in the shooting space A1, in addition to the strobe of the ceiling strobe unit 24.

The camera 101 performs shooting according to the control by the control section 201, and outputs an image obtained by the shooting to the control section 201.

The editing section 209A performs editing processing intended for the user in the editing space A2-1. The editing section 209A is configured from the tablet built-in monitor 131, the touch pens 132A and 132B, and a speaker 231. The editing section 209B has the same configuration as the editing section 209A, and performs editing processing intended for the user in the editing space A2-2.

The tablet built-in monitor 131 displays an editing screen according to the control by the control section 201, and detects an operation of the user to the editing screen. A signal that indicates content of the operation of the user is supplied to the control section 201, and editing of a shot image to be edited is performed.

The post-service section 210 performs post-service processing intended for the user in the post-service space A3. The post-service processing is processing to provide the above-described post-service function to the user. The post-service section 210 is configured from the tablet built-in monitor 161, the speaker 163, and a printer 241. A sticker sheet unit 242 is mounted to the printer 241.

The printer 241 prints shot images and edited images on a sticker sheet stored in the sticker sheet unit 242, based on print data supplied from the control section 201, and discharges the printed sheet to the sticker sheet outlet 162.

[Configuration of Control Section]

Figure 11:
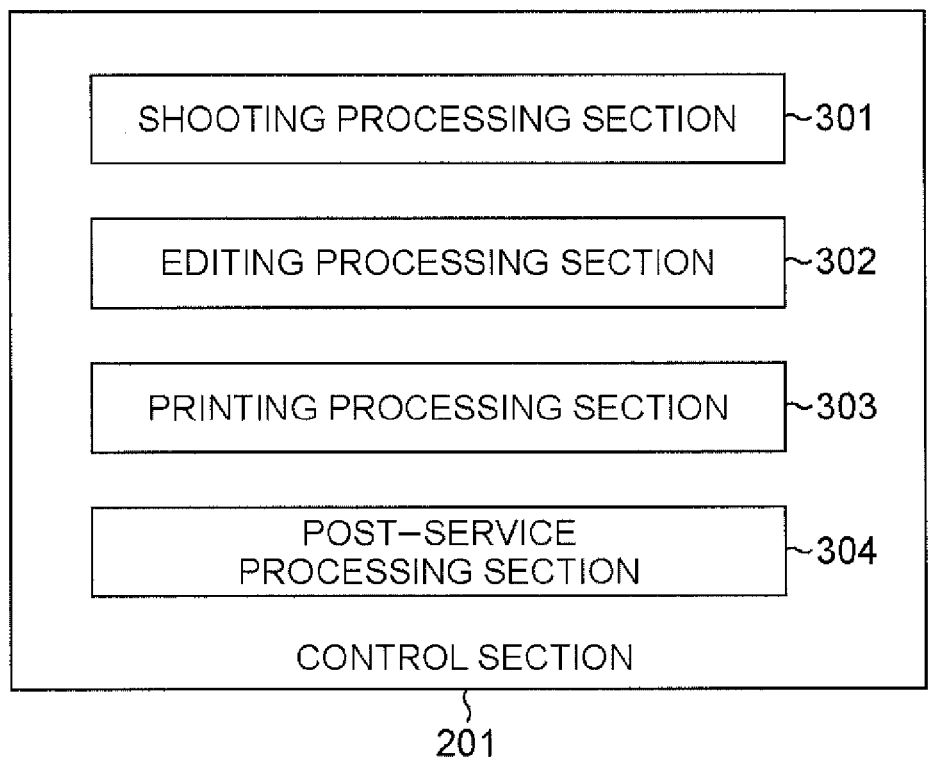
FIG. 11 is a block diagram illustrating a functional configuration example of a control section.

FIG. 11 is a block diagram illustrating a functional configuration example of the control section 201. A functional section illustrated in FIG. 11 is realized by execution of a predetermined program by the CPU in the control section 201.

To be specific, in the control section 201, a shooting processing section 301, an editing processing section 302, a printing processing section 303, and a post-service processing section 304 are realized.

The shooting processing section 301 controls sections of the shooting section 208 to perform pre-service processing and the shooting processing. The pre-service processing includes processing related to the charge inserted when the photo sticker creating device 1 is used, and is performed before the shooting processing. The editing processing section 302 controls sections of the editing section 209A and the editing section 209B to perform the editing processing. The printing processing section 303 controls the printer 241 of the post-service section 210 to perform the printing processing. The post-service processing section 304 controls the tablet built-in monitor 161 of the post-service section 210, and the like to perform the post-service processing.

[Configuration Example of Editing Processing Section]

Figure 12:
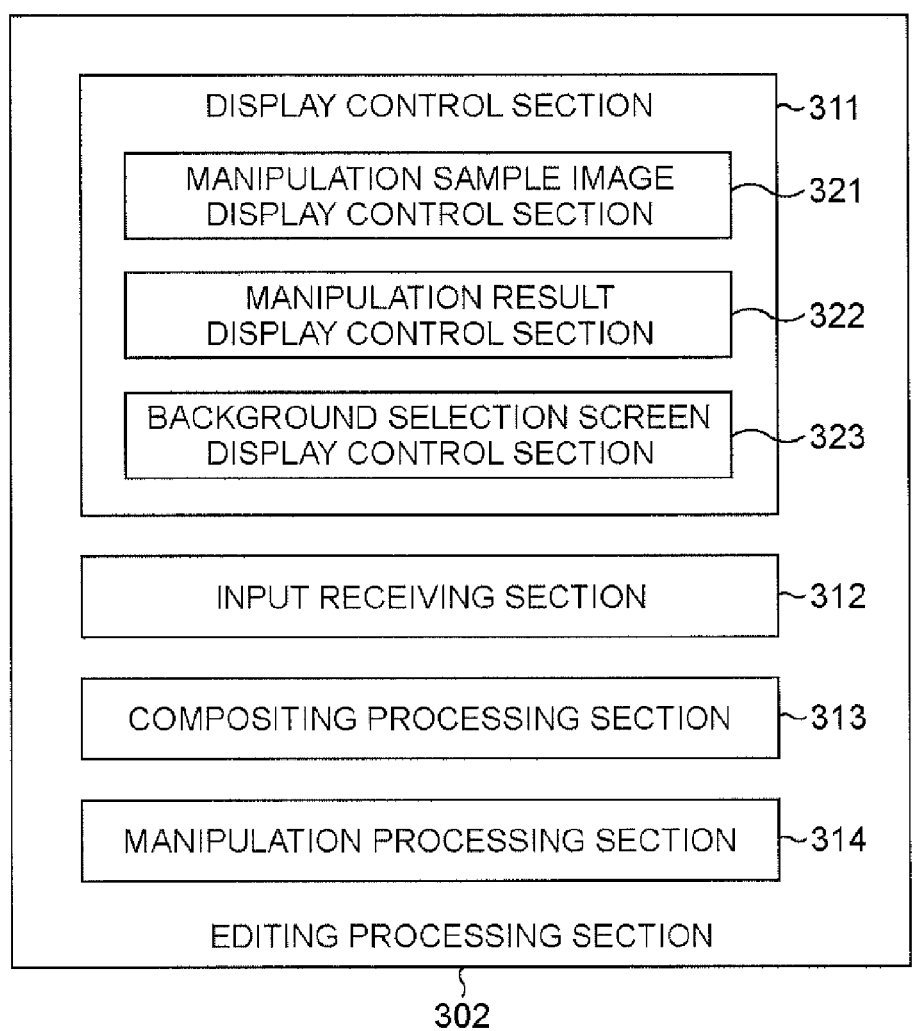
FIG. 12 is a block diagram illustrating a functional configuration example of an editing processing section.

FIG. 12 is a block diagram illustrating a functional configuration example of the editing processing section 302. The photo sticker creating device 1 functions as a photo decoration device by an operation of the editing processing section 302.

The editing processing section 302 performs the editing processing to allow the user to select one shot image of the plurality of shot images obtained by the shooting processing, as an editing target image. Next, the editing processing section 302 allows the user to select an image for compositing, which is prepared in advance, and is to be composited to the selected editing target image. Then, the editing processing section 302 composites the selected image for compositing to the editing target image. The editing processing section 302 outputs a plurality of composite images obtained as described above, as edited images.

Here, the image for compositing includes a pen image that is an image made of lines to be composited corresponding to a drawing locus of a drawing input by the user, a stamp image that is an image of graphics and characters to be composited to an arbitrary position of the shot image, and a frame image that is an image of patterns and designs to be composited to a predetermined position of the shot image. That is, the editing processing section 302 composites the pen image, the stamp image, and the frame image to the shot image based on an editing input by the user, thereby to generate a composite image. These images for compositing are stored in the storage section 202. Note that, hereinafter, these images for compositing are appropriately referred to as editing tools.

Further, in the editing processing, the editing processing section 302 has an extra image for mobile creation function to create an image (hereinafter, referred to as "Keitai Omake") used in a mobile terminal, such as a standby image of the mobile terminal or a decorative image added to text data of a blog or a mail, from a predetermined shot image according to an instruction of the user, and to output the obtained Keitai Omake as a mobile transmission image.

The editing processing section 302 is configured from a display control section 311, an input receiving section 312, a compositing processing section 313, and a manipulation processing section 314.

The display control section 311 controls display of the tablet built-in monitors 131 in the editing sections 209A and 209B. For example, the display control section 311 displays the shot image in a predetermined area of the editing screen displayed in the tablet built-in monitor 131 as an editing target image that serves as an object of an editing input, and displays a plurality of images for compositing to be composited to the editing target image on the editing screen, in a palette for editing described below.

The input receiving section 312 receives operation inputs to the tablet built-in monitors 131 using the touch pens 132A and 132B by the user. For example, the input receiving section 312 receives selection of the image for compositing to be composited to the editing target image through the palette for editing.

The compositing processing section 313 performs compositing processing for compositing the image for compositing selected by the user through the palette for editing to the editing target image.

The manipulation processing section 314 applies various types of manipulation processing to the predetermined shot image according to an instruction of the user at the time of creating the Keitai Omake.

Further, the display control section 311 includes a manipulation sample image display control section 321, a manipulation result display control section 322, and a background selection screen display control section 323.

The manipulation sample image display control section 321 displays, on a display screen, a manipulation sample image group made of a plurality of manipulation sample images corresponding to the manipulation processing applied to the predetermined shot image at the time of creating the Keitai Omake, for each type of the manipulation processing. The manipulation sample images that configure the manipulation sample image group are samples of manipulation results of application of image processing, and images for presenting content of the manipulation processing to the user.

Here, when any one of the manipulation sample images is selected by the user, the input receiving section 312 receives selection of the one manipulation sample image, and the manipulation processing section 314 applies the manipulation processing applied to the manipulation sample image, the selection of which has been received, to the shot image.

Then, the manipulation result display control section 322 displays the shot image subjected to the manipulation processing in a manipulation result displaying area provided on the screen.

Further, the background selection screen display control section 323 displays a background selection screen for selecting a background image to be composited to a background area of the Keitai Omake (shot image) according to an instruction of the user at the time of creating the Keitai Omake.

[Operation of Photo Sticker Creating Device]

Next, an operation of the photo sticker creating device 1 will be described.

Figure 13:
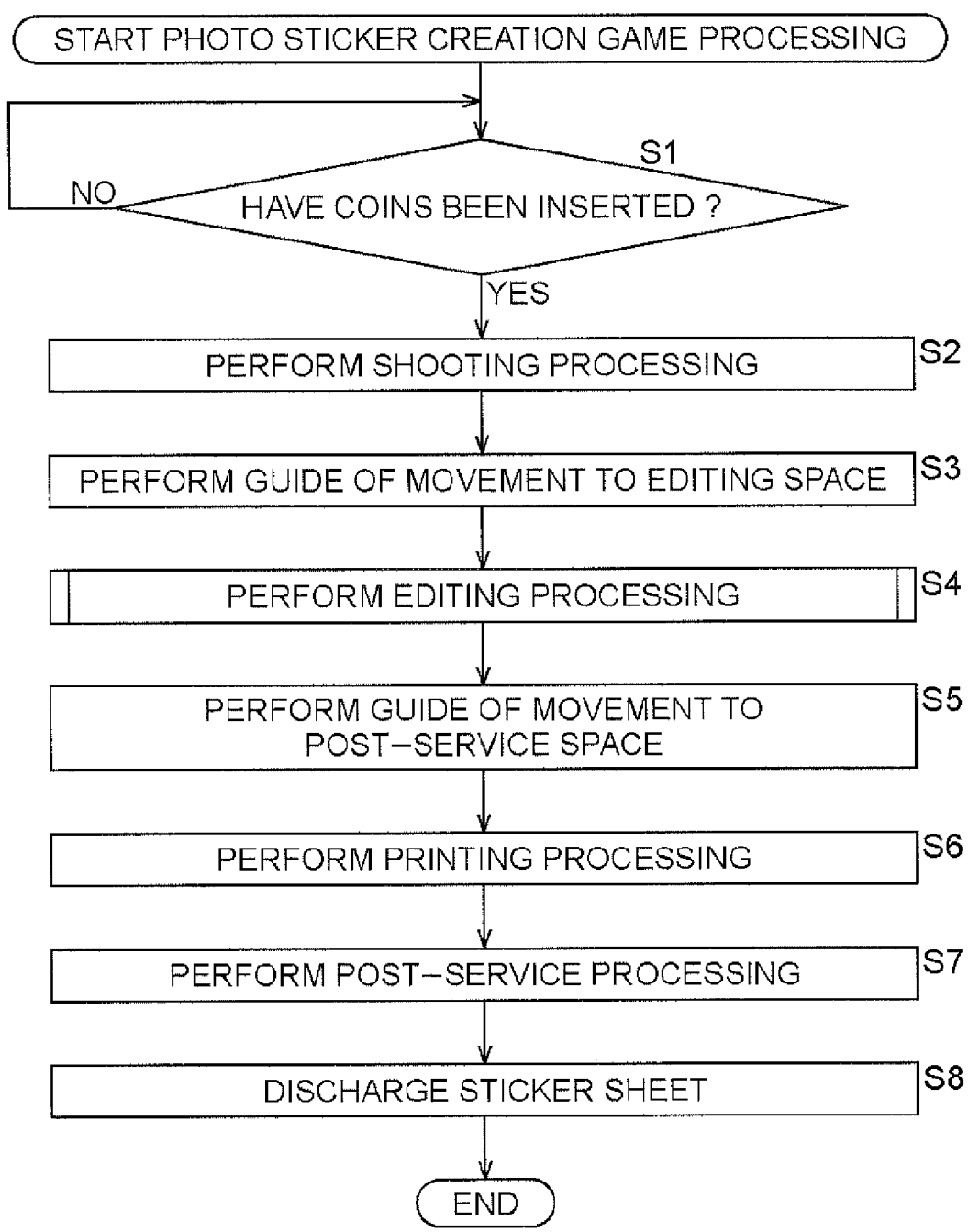
FIG. 13 is a flowchart describing an example of a flow of photo sticker creation game processing.

First, processing of the photo sticker creating device 1 that provides a photo sticker creation game will be described with reference to the flowchart of FIG. 13.

In step S1, the shooting processing section 301 of the photo sticker creating device 1 determines whether coins of a predetermined amount of money have been inserted based on a signal supplied from the coin processing section 221, and waits until determining the coins have been inserted. At this time, the shooting processing section 301 may perform the pre-service processing that is processing for outputting an image moving picture or guidance of a photo sticker creation game to the user in the shooting space A1 before shooting. The pre-service processing is performed by displaying of an image in the touch panel monitor 92, or by outputting of a sound from the speaker 224.

In step S2, when having determined that the coins have been inserted in step S1, the shooting processing section 301 performs the shooting processing. In the shooting processing, shooting is performed with the user in the shooting space A1 as an object.

Although detailed description of the shooting processing is omitted, shooting based on a shooting course selected from a plurality of shooting courses by the user is performed in the shooting processing. As the shooting courses, a beauty course for capturing the user prettily and beautifully, and an edgy course for capturing the user in a more stylish manner are prepared.

When the beauty course has been selected as the shooting course, the shooting processing section 301 causes the background curtain unit 25 to lower the chroma key curtain, and performs chroma key shooting for applying the chroma key processing to the shot image. When the edgy course has been selected, the shooting processing section 301 performs the shooting in which the chroma key processing is not applied, in a state where the curtain is kept up and the background curtain unit 25 is not allowed to lower the chroma key curtain.

In step S3, the shooting processing section 301 guides the user in the shooting space A1 to move to the editing space A2-1 or the editing space A2-2. The guide of movement to the editing space A2-1 or the editing space A2-2 is performed by displaying of an image in the touch panel monitor 92, or by outputting of a sound from the speaker 224.

In step S4, the editing processing section 302 controls the editing section 209A or the editing section 209B corresponding to the editing space, of the editing space A2-1 and the editing space A2-2, the editing space being the destination of the user who has completed the shooting processing, to perform the editing processing. Details of the editing processing will be described below with reference to the flowchart of FIG. 14.

In step S5, the editing processing section 302 guides the user who has completed the editing processing to move to the post-service space A3. The guide of movement to the post-service space A3 is performed by displaying of a screen in the tablet built-in monitor 131, or by outputting of a sound from the speaker 231.

In step S6, the printing processing section 303 performs printing processing. The shot images or the edited images are printed on a sticker sheet according to a layout selected by the user by the print processing.

In step S7, the post-service processing section 304 performs the post-service processing with respect to the user who waits for completion of printing. The post-service processing section 304 performs processing for transmitting the shot image or the edited image to the mobile terminal, and the like as the post-service processing.

In step S8, when the printing has been completed, the post-service processing section 304 discharges the sticker sheet on which the images have been printed through the sticker sheet outlet 162, and terminates the processing.

[Details of Editing Processing]

Next, details of the editing processing performed in step S4 of FIG. 13 will be described with reference to the flowchart of FIG. 14.

In step S51, the display control section 311 of the editing processing section 302 displays a profile input screen, which is a screen for allowing the user to input a profile, in the tablet built-in monitor 131. On the profile input screen, a sentence expressing a question to the user (for example, "who have you taken a picture with today?", "what are you doing today?", or the like), and candidates (alternatives) of a response to the question are displayed. Any of the candidates of the response displayed on the profile input screen is selected by the user as a profile of the user.

In step S52, the display control section 311 displays a name input screen in the tablet built-in monitor 131. Keys, buttons, and the like for allowing the users to input respective names are displayed on the name input screen.

In step S53, the editing processing section 302 determines whether the shooting has been performed with the beauty course in the shooting processing.

In step S54, when having determined that the shooting has been performed with the beauty course in step S53, the display control section 311 displays a background selection screen in the tablet built-in monitor 131. On the background selection screen, a plurality of images with various colors and patterns is displayed as background images, together with a message that prompts selection of a color of the background.

The background image is an image used as a background of the user appearing in the shot image. As described above, the shooting with the beauty course is performed in a state where the chroma key curtain is lowered. In the editing processing after the shooting processing with the beauty course is performed, a shot image in which the background image is composited to the background of the user by the chroma key processing is used as the image to be edited.

Note that, here, the background images of the number of shot images, for example, five background images are selected by the user. Alternatively, as the background images, a background image set that is a set of five background images based on a predetermined theme may be displayed and selected.

In step S55, the compositing processing section 313 reads five shot images from the storage section 202, for example, and composites respective shot images and background images. That is, the compositing processing section 313 extracts a background area in the shot image, and performs the chroma key processing for compositing the background image to the extracted area, for the respective shot images.

Meanwhile, when having determined that the shooting has not been performed with the beauty course in step S53, that is, when the having determined that the shooting has been performed with the edgy course, the processing of steps S54 and S55 is skipped.

In step S56, the display control section 311 displays the editing screen in the tablet built-in monitor 131. On the editing screen, the shot image to which the background image has been composited, or the shot image read from the storage section 202 is displayed.

Figure 15:
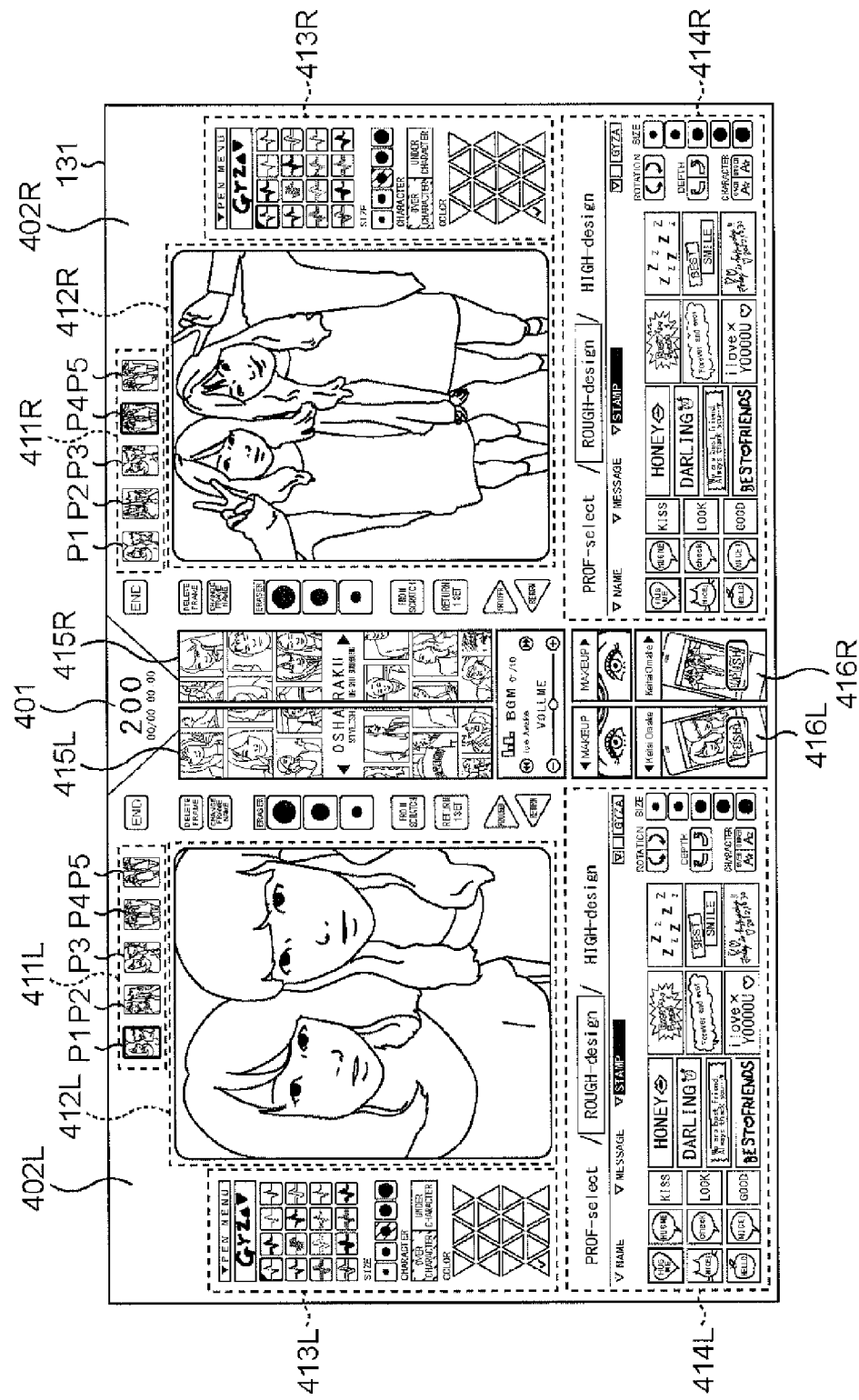
FIG. 15 is a diagram illustrating an example of an editing screen.

FIG. 15 is a diagram illustrating an example of the editing screen.

Basically, the editing screen is configured such that main configurations are symmetrically provided. An area 402L that is a left-half area is an area used by the user on the left side facing the tablet built-in monitor 131, and an area 402R that is a right-half area is an area used by the user on the right side facing the tablet built-in monitor 131. A remaining time of the editing processing, and the like are displayed in a central area 401. Note that the dashed lines surrounding respective areas of FIG. 15 are not displayed for real.

A thumbnail image display area 411L in a central upper portion of the area 402L is a display area of thumbnail images indicating the shot images. The user (the user on the left side facing the tablet built-in monitor 131) selects a thumbnail image displayed in the thumbnail image display area 411L, thereby to select the shot image to be edited.

In the example of FIG. 15, thumbnail images P1 to P5 indicating the five shot images are arranged and displayed in the thumbnail image display area 411L in the order of shooting and, and a left-end thumbnail image P1 is selected, whereby the first shot image becomes an object to be edited.

A relatively large editing area 412L formed in an approximately center of the area 402L is a display area of the shot image selected as the object to be edited. In the example of FIG. 15, the thumbnail image P1 is selected from the thumbnail image display area 411L, whereby the first shot image is displayed. The user selects an editing tool using the touch pen 132A, and can perform editing of the shot image displayed in the editing area 412L.

A pen palette display area 413L on the left side of the editing area 412L is a display area of a pen palette used for selection of a pen image used for hand writing input. In the pen palette display area 413L, a plurality of buttons used for selecting a type of line, a thickness, and a color of the pen image is displayed. The pen palette in the pen palette display area 413L is displayed in a steady manner while the editing screen is displayed.

A palette for editing display area 414L under the editing area 412L is a display area of a palette for editing used for selection of various editing tools (images for compositing), such as stamp images. The images for compositing displayed in the palette for editing are divided into categories of "PROF-select", "ROUGH-design", and "HIGH-design", and tabs to which respective category names are assigned are selected, whereby the images for compositing displayed in the palette for editing display area 414L can be switched.

In the example of FIG. 15, the "ROUGH-design" tab is selected, and selection buttons of the images for compositing that belong to the category of "ROUGH-design" are displayed.

A one touch editing button 415L in the area 401 is a button operated when one touch editing is performed. The one touch editing is a function to allow the user to perform the editing work of content set in advance with a single operation. Accordingly, the user who is not accustomed to the editing work (scribbling) can easily finish the editing work. The one touch editing button 415L is operated, whereby a plurality of images for compositing set in advance is collectively composited to the shot image.

A Keitai Omake button 416L operated when an image (Keitai Omake) transmitted to a mobile terminal such as a mobile phone through the server is edited is displayed on the right side of the palette for editing display area 414L. On the vertically long rectangular Keitai Omake button 416L, characters of "MOBILE Keitai Omake" and an image of an appearance of a smart phone that is one of mobile phones are displayed, and characters of "PUSH" are superimposed and displayed on the image of an appearance of a smart phone. In a display of the smart phone, the image of an appearance of which is displayed in the Keitai Omake button 416L, a shot image in which the user appears is fit in.

When the Keitai Omake button 416L is operated, the Keitai Omake can be created.

The same configurations as the configurations of the area 402L are arranged in the area 402R used by the user who is on the right side facing the tablet built-in monitor 131 such that positions of the configurations of the area 402R become symmetrical to the positions of the configurations of the area 402L. In the example of FIG. 15, the thumbnail image P4 is selected from the thumbnail image display area 411R, whereby the fourth shot image becomes an object to be edited.

Figure 14:
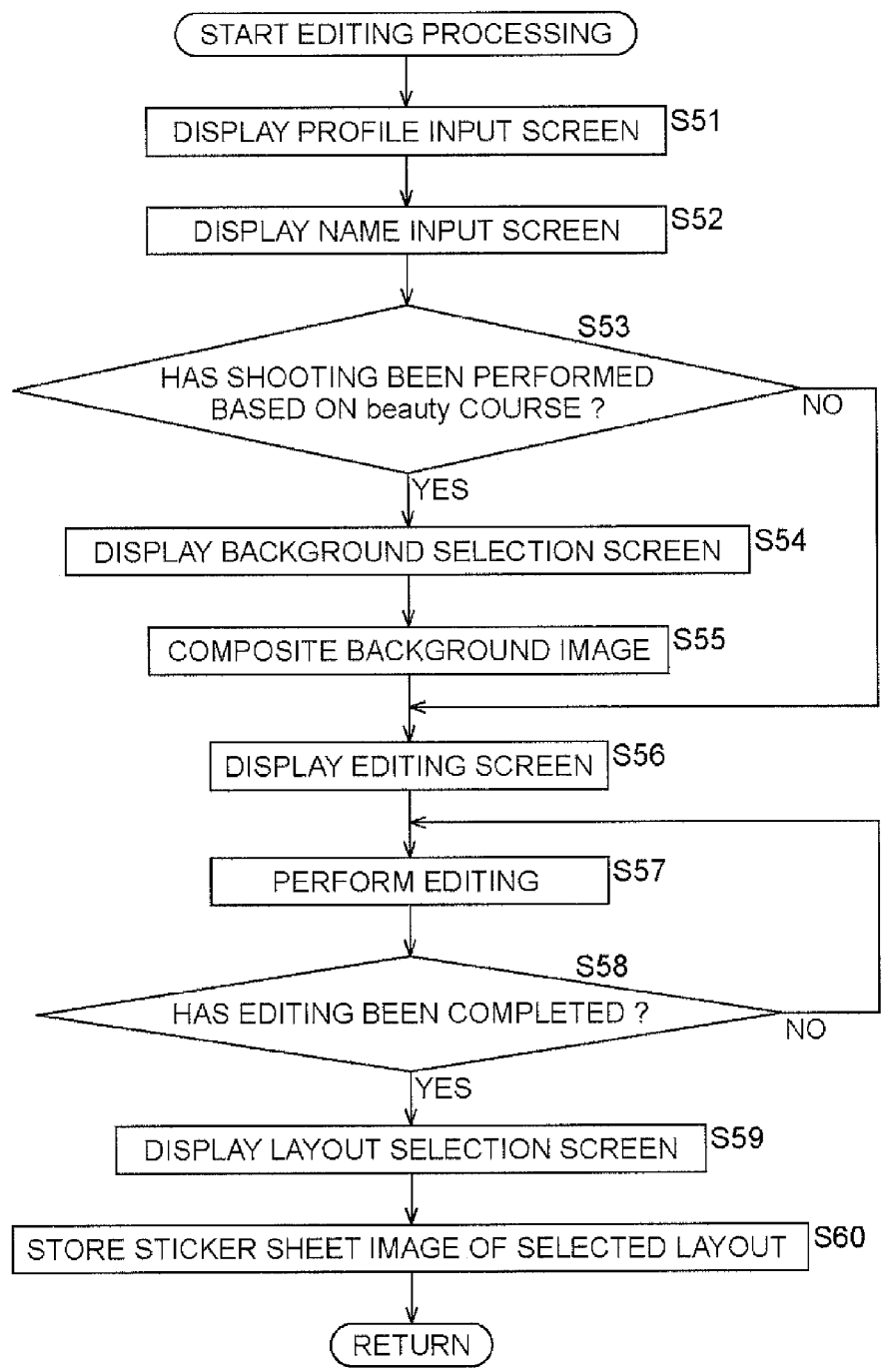
FIG. 14 is a flowchart describing editing processing.

Referring back to the flowchart of FIG. 14, in step S57, the compositing processing section 313 performs editing of the shot image, that is, performs compositing (affixing) of the images for compositing selected by the user, according to an editing input by the user.

In step S58, the editing processing section 302 determines whether the editing has been completed, and when having determined that the editing has not been completed, the processing is returned to step S57, and the editing of the shot image is continued. The editing of the shot image is continued until a completion button is operated or until a time limit passes.

Meanwhile, in step S59, when having determined that the editing has been completed in step S58, the display control section 311 displays a layout selection screen in the tablet built-in monitor 131. On the layout selection screen, a sticker layout for determining arrangement of the edited image on the sticker sheet output at the end is displayed.

In step S60, when a predetermined sticker layout has been selected from the layout selection screen, the editing processing section 302 stores a sticker sheet image with the sticker layout selected by the user in the storage section 202. Following that, the processing is returned to step S4 of FIG. 13, and subsequent processing is performed.

[Details of Keitai Omake Creation Processing]

The Keitai Omake creation processing executed when the Keitai Omake button 416L (or 416R) is operated in the example of FIG. 15 will be described with reference to the flowchart of FIG. 16. Hereinafter, processing of when the Keitai Omake button 416L is operated will be described.

In step S101, when the Keitai Omake button 416L has been operated, the display control section 311 displays a cut-out screen in the area 402L that is a left-half screen of the editing screen. The cut-out screen is a screen for allowing selection of a shot image that becomes the Keitai Omake, or allowing selection of an area (trimming area), which is cut-out in the selected shot image.

Figure 17:
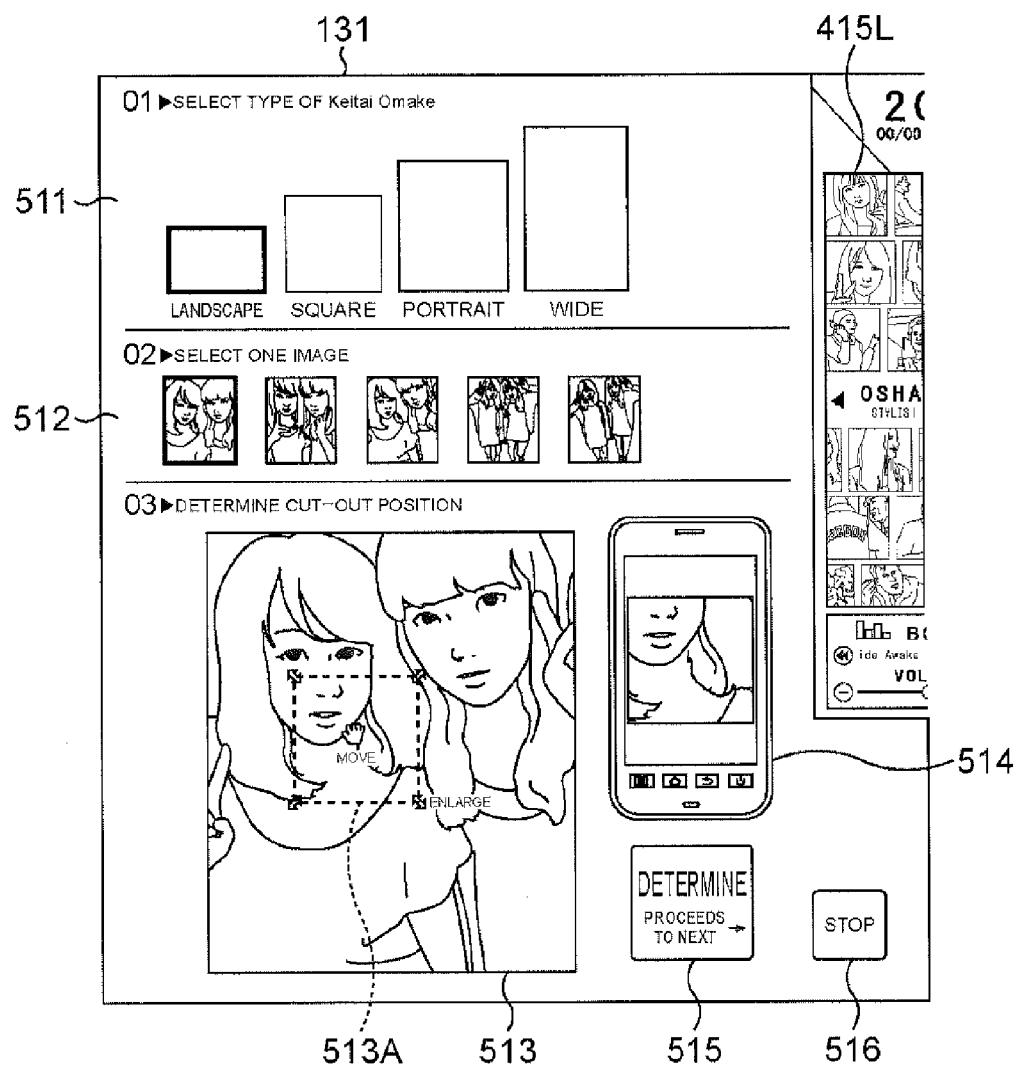
FIG. 17 is a diagram illustrating an example of a cut-out screen.

FIG. 17 is a diagram illustrating an example of the cut-out screen.

A shape selection area 511 at an upper portion on the cut-out screen is an area for allowing selection of the shape of a cut-out frame 513A described below from four types of shapes: "landscape", "square", "portrait", and "wide". In the shape selection area 511, when the shape of "landscape" has been selected, the cut-out frame 513A becomes a horizontally long rectangular shape, and when the shape of "square" has been selected, the cut-out frame 513A becomes a square shape. When the shape of "portrait" has been selected, the cut-out frame 513A becomes a vertically long rectangular shape, and when the shape of "wide" has been selected, the cut-out frame 513A becomes a vertically longer rectangular shape than the "portrait".

An image selection area 512 formed under the shape selection area 511 is an area in which thumbnail images of five shot images that are to be objects to be edited are displayed, for example. A shot image selected from the image selection area 512 is enlarged and displayed in an editing target image display portion 513 under the image selection area 512 as an editing target image for the Keitai Omake.

The cut-out frame 513A of the shape selected in the shape selection area 511 is superimposed and displayed on the editing target image displayed in the editing target image display portion 513. The cut-out frame 513A is displayed with a certain size, and when the user drags any of arrow-shaped icons displayed at four corners of the cut-out frame 513A outwardly using the touch pen 132A, the cut-out frame 513A is enlarged with an aspect ratio being unchanged. Further, when the user drags any of the arrow-shaped icons displayed at four corners of the cut-out frame 513A inwardly using the touch pen 132A in a state where the cut-out frame 513A is enlarged, the cut-out frame 513A is reduced in size with the aspect ratio being unchanged. Further, when the user drags a hand-shaped icon displayed in the center of the cut-out frame 513A or any of four sides of the cut-out frame 513A, into a predetermined direction using the touch pen 132A, the cut-out frame 513A is moved into the direction.

In step S102, when the shape of the cut-out frame 513A has been selected on the cut-out screen, the input receiving section 312 receives selection of the cut-out frame. At this time, an area in the cut-out frame 513A in the editing target image is displayed in a cut-out image display portion 514. The cut-out image display portion 514 is formed in a portion of a display of the image that expresses the appearance of the mobile phone (smart phone). When the size and the shape of the cut-out frame 513A have been selected and a determination button 515 has been operated, the area in the cut-out frame 513A in the editing target image is cut-out by the editing processing section 302. Hereinafter, description will be given on the assumption that the area cut-out with the cut-out frame 513A is the entire editing target image, that is, the shot image as it is selected in the image selection area 512.

Note that, when a stop button 516 displayed on the right side of the determination button 515 is operated, the cut-out screen is closed, and the Keitai Omake creation processing is terminated.

In step S103, the editing processing section 302 determines whether the shooting has been performed with the beauty course in the shooting processing.

When having determined that the shooting has been performed with the beauty course in step S103, the processing proceeds to step S104, and the display control section 311 displays a manipulation screen. The manipulation screen is a screen for applying various types of manipulation processing to the editing target image of the Keitai Omake. The manipulation processing referred here indicates two types of processing for changing color information of the image and for superimposing a layer image on the image.

Figure 18:
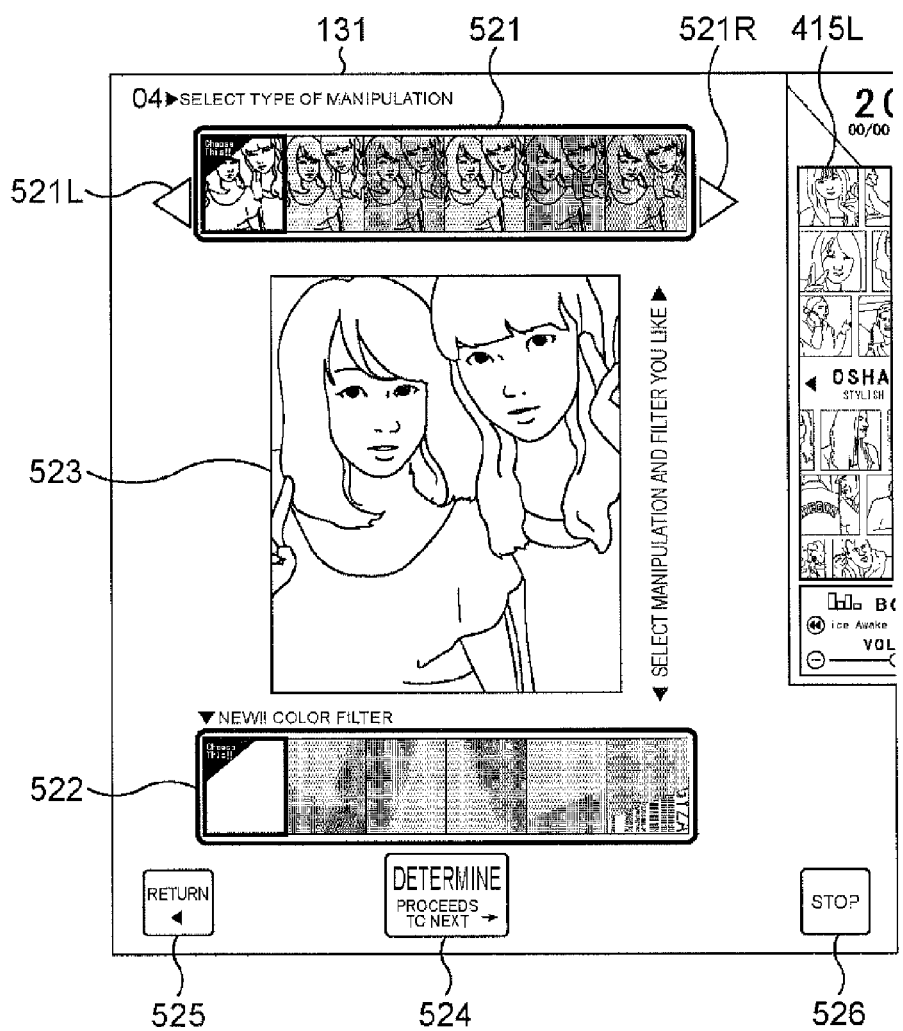
FIG. 18 is a diagram illustrating an example of a manipulation screen.

FIG. 18 is a diagram illustrating an example of the manipulation screen.

In a manipulation sample image display area 521 at an upper portion on the manipulation screen, six manipulation sample images are arrayed and displayed right and left in line, as the manipulation sample image group, the manipulation sample images serving as samples of manipulation results of color information change processing for changing the color information (a tone curve, a luminance value, a contrast, and the like) of a part of or the entire image, which is applied as the manipulation processing. Note that the manipulation sample images may be arranged and displayed in a predetermined direction, such as being arranged and displayed up and down in line. According to the color information change processing, an atmosphere of the entire image can be changed. Different pieces of color information are set to the manipulation sample images displayed in the manipulation sample image display area 521, respectively, so that different variations of the color information change processing are applied to the manipulation sample images.

As described above, the samples of the manipulation results of when the different variations of the color information change processing is applied to the editing target image are displayed in the manipulation sample image display area 521 as the manipulation sample images. Therefore, the user can easily imagine the finish after the manipulation processing.

In the example of FIG. 18, as the manipulation sample images displayed in the manipulation sample image display area 521, the images obtained such that the different variations of the color information change processing are applied to one editing target image are displayed. However, images obtained such that the different variations of the color information change processing are applied to a model image in which a model is captured or a white plain image may be displayed.

Further, a larger number of the variations of the color information change processing are prepared than the six patterns displayed in the manipulation sample image display area 521. Move buttons 521L and 521R provided at the right and left of the manipulation sample image display area 521 are operated, whereby the entire manipulation sample images arrayed and displayed in the manipulation sample image display area 521 in the right and left direction are shifted right and left. Accordingly, the manipulation sample images corresponding to other patterns of the color information change processing are displayed.

Note that the entire manipulation sample images displayed in the manipulation sample image display area 521 may be shifted such that, by the user tapping one of the manipulation sample images at both ends of the manipulation sample image display area 521 with the touch pen 132A, the tapped manipulation sample image is moved into an inner side of the manipulation sample image display area 521. For example, when the manipulation sample image at the right end of the manipulation sample image display area 521 is tapped with the touch pen 132A, the entire manipulation sample images displayed in the manipulation sample image display area 521 are shifted to the left side such that the tapped manipulation sample image is moved to the left side by one image.

Further, the manipulation sample images displayed in the manipulation sample image display area 521 may be displayed with predetermined staging (to be specific, being slid and displayed to the right and left) by the user performing a flick operation to the manipulation sample image display area 521 with the touch pen 132A in the right and left direction.

Note that patterns and setting content of the variations of the color information change processing may be changed according to the shape of the cut-out frame 513A selected on the cut-out screen (FIG. 17). Accordingly, a variety of images can be provided.

In a manipulation sample image display area 522 at a lower portion on the manipulation screen, six manipulation sample images are arrayed and displayed in the right and left direction in line, as the manipulation sample image group, the manipulation sample images serving as samples of manipulation results of texture change processing for superimposing a layer image (foreground image) having predetermined texture and/or a predetermined color on the image, which is applied as the manipulation processing. The texture of the layer image to be superimposed referred here expresses visual feeling of the surface of the image, such as brightness or transparency. Note that the manipulation sample images may be arrayed and displayed in a predetermined direction, such as being arranged and displayed up and down in line. According to the texture change processing, impression of the entire image can be changed. Different textures or colors are set to the manipulation sample images displayed in the manipulation sample image display area 522, respectively, whereby different variations of the texture change processing are applied to the manipulation sample images.

As described above, the samples of the manipulation results of when different variations of the texture change processing are applied are displayed in the manipulation sample image display area 522 as the manipulation sample images. Therefore the user can easily imagine the finish after manipulation.

In the example of FIG. 18, the images obtained such that the different variations of the texture change processing are applied to a white plain image are displayed as the manipulation sample images displayed in the manipulation sample image display area 522. However, images obtained such that the different variations of the texture change processing are applied to the editing target image or a model image may be displayed. Accordingly, the user can more specifically imagine the finish after manipulation.

Further, a larger number of the variations of the texture change processing are prepared than the six patterns displayed in the manipulation sample image display area 522. The user taps one of the manipulation sample images at both ends of the manipulation sample image display area 522 with the touch pen 132A, whereby the entire manipulation sample images displayed in the manipulation sample image display area 522 are shifted such that the tapped manipulation sample image is moved into an inner side of the manipulation sample image display area 522, and the manipulation sample images corresponding to other patterns of the texture change processing becomes able to be displayed. For example, when the manipulation sample image at the right end of the manipulation sample image display area 522 is tapped with the touch pen 132A, the entire manipulation sample images displayed in the manipulation sample image display area 522 are shifted to the left such that the tapped manipulation sample image is moved to the left by one image.

Further, similarly to the manipulation sample image display area 521, the move buttons may be provided at the right and left of the manipulation sample image display area 522, and with an operation of the move buttons, the entire manipulation sample images displayed in the manipulation sample image display area 522 may be shifted to the right and left. The manipulation sample images displayed in the manipulation sample image display area 522 may be slid and displayed to the right and left by the user performing a flick operation to the manipulation sample image display area 522 in the right and left direction with the touch pen 132A.

Note that patterns and setting content of the variations of the texture change processing may be changed according to the shape of the cut-out frame 513A selected on the cut-out screen (FIG. 17). Accordingly, a variety of images can be provided.

Further, in a default state of the first displayed manipulation screen, non-manipulation sample images that do not correspond to any of the manipulation processing (that are not subjected to any of the manipulation processing) are displayed, as leftmost manipulation sample images in the respective manipulation sample image display areas 521 and 522. These non-manipulation sample images are emphasized with thick frames while being selected.

Note that angles of view (the aspect ratios) of the manipulation sample images in the manipulation sample image display areas 521 and 522 are the same as the angle of view of the shot image, regardless of the shape of the cut-out frame 513A selected in the shape selection area 511 on the cut-out screen (FIG. 17). Accordingly, it is not necessary to change the angles of view of the manipulation sample images according to the shape of the selected cut-out frame 513A. Therefore, in the manipulation sample image display area 521, images obtained such that the different variations of the color information change processing are applied to the shot image selected in the image selection area 512 on the cut-out screen are displayed.

Further, in the example of FIG. 18, only one manipulation result display area 523 for displaying the editing target image subjected to the manipulation processing is provided between the manipulation sample image display area 521 and the manipulation sample image display area 522 on the manipulation screen. In the manipulation result display area 523, a manipulation result obtained such that the manipulation processing corresponding to the manipulation sample images selected in the manipulation sample image display areas 521 and 522 is applied to the editing target image is displayed larger than the manipulation sample images displayed in the manipulation sample image display areas 521 and 522.

Note that the angle of view (the aspect ratio) of the editing target image in the manipulation result display area 523 may be the same as the angle of view of the shot image regardless of the shape of the cut-out frame 513A selected in the shape selection area 511 on the cut-out screen (FIG. 17) or may be an angle of view according to the shape of the selected cut-out frame 513A.

Further, a determination button 524 for determining the manipulation result displayed in the manipulation result display area 523 is provided at a central portion under the manipulation sample image display area 522. A return button 525 for returning display of the displayed manipulation screen to one previous screen the cut-out screen) is provided at a left side below the manipulation sample image display area 522. A stop button 526 for terminating the Keitai Omake creation processing is provided at a right side below the manipulation sample image display area 522.

Note that the display of the manipulation sample images in the manipulation sample image display areas 521 and 522 is controlled by the manipulation sample image display control section 321, and the display of the manipulation result in the manipulation result display area 523 is controlled by the manipulation result display control section 322.

In step S105, when any of the manipulation sample images have been selected by the user in the respective manipulation sample image display areas 521 and 522, the input receiving section 312 receives the selections of the manipulation sample images, and the manipulation processing section 314 applies the manipulation processing corresponding to the manipulation sample images, the selections of which have been received, to the editing target image.

At this time, with the control of the manipulation sample image display control section 321, the manipulation sample images selected in the respective manipulation sample image display areas 521 and 522 are clearly indicated. To be specific, the selected manipulation sample images are emphasized with thick frames.

Further, at this time, in the manipulation result display area 523 on the manipulation screen (FIG. 18), the editing target image, to which the manipulation processing corresponding to the selected manipulation sample images is applied in addition to the already applied manipulation processing, every time selections of the manipulation sample images in the respective manipulation sample image display areas 521 and 522 are received, is displayed, by the control of the manipulation result display control section 322.

To be specific, the manipulation processing corresponding to the manipulation sample image lastly selected in the manipulation sample image display area 521, and the manipulation processing corresponding to the manipulation sample image lastly selected in the manipulation sample image display area 522 are superimposingly applied to the editing target image displayed in the manipulation result display area 523. The manipulation processing corresponding to the manipulation sample images lastly selected in the respective manipulation sample image display areas 521 and 522 is kept reflected in the editing target image displayed in the manipulation result display area 523 unless the Keitai Omake creation processing is terminated.

Figure 19:
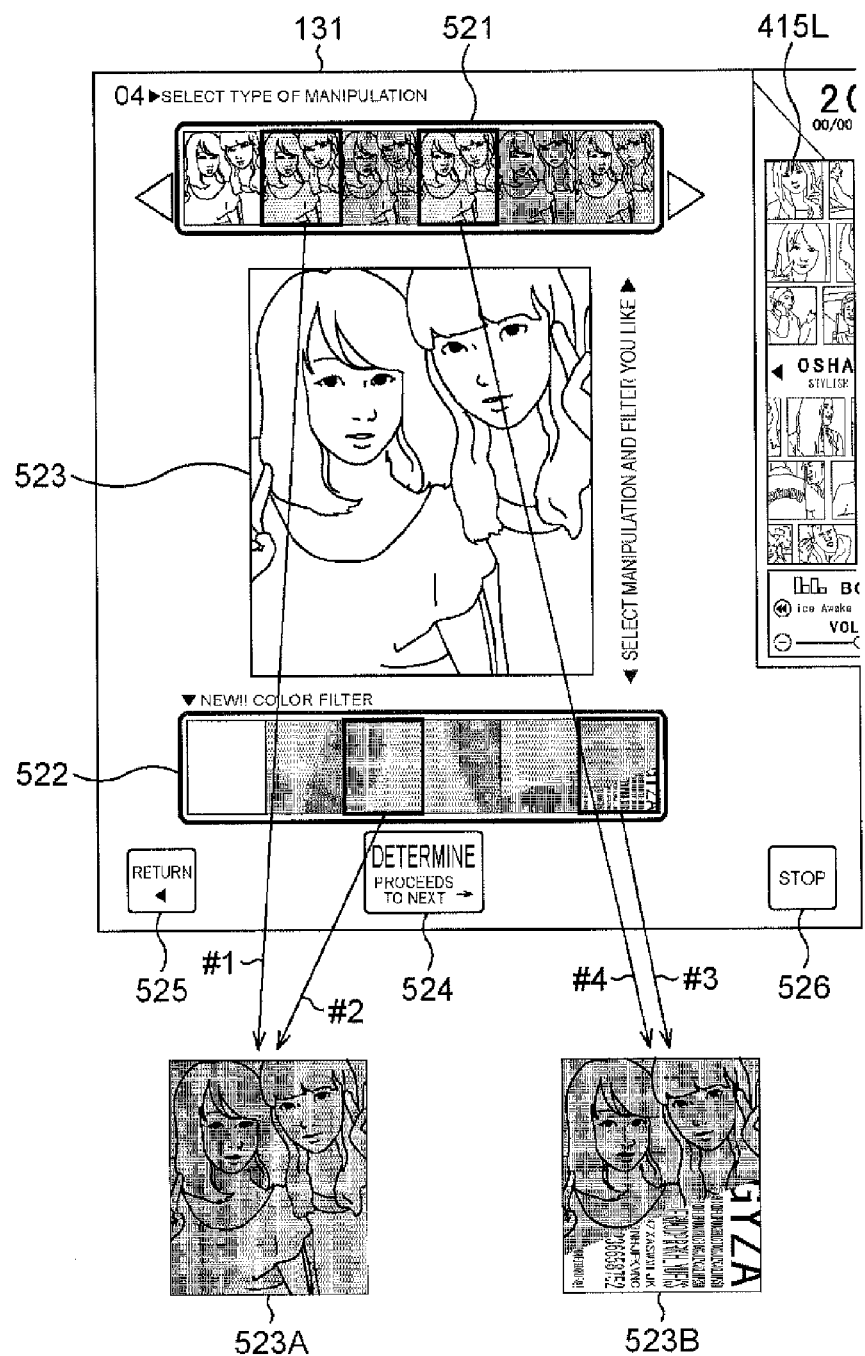
FIG. 19 is a diagram describing display of a manipulation result.

For example, in FIG. 19, first, when the second manipulation sample image from the left in the manipulation sample image display area 521 has been selected, as illustrated by an arrow #1, the editing target image subjected to the color information change processing corresponding to the manipulation sample image is displayed in the manipulation result display area 523.

Next, when the third manipulation sample image from the left in the manipulation sample image display area 522 has been selected, as illustrated by an arrow #2, an editing target image 523A, to which the texture change processing corresponding to the manipulation sample image has been applied in addition to the color information change processing corresponding to the second manipulation sample image from the left in the manipulation sample image display area 521, is displayed in the manipulation result display area 523.

Further, although not illustrated, when the third manipulation sample image from the left in the manipulation sample image display area 521 has been selected, an editing target image, which is obtained such that the color information change processing corresponding to the third manipulation sample image from the left has been applied to the editing target image 523A, instead of the color information change processing corresponding to the second manipulation sample image from the left in the manipulation sample image display area 521, is displayed in the manipulation result display area 523.

Further, in FIG. 19, first, when the rightmost manipulation sample image in the manipulation sample image display area 522 has been selected, as illustrated by an arrow #3, an editing target image subjected to the texture change processing corresponding to the manipulation sample image is displayed in the manipulation result display area 523.

Next, when the fourth manipulation sample image from the left in the manipulation sample image display area 521 has been selected, as illustrated by an arrow #4, an editing target image 523B, to which the color information change processing corresponding to the manipulation sample image has been applied in addition to the texture change processing corresponding to the rightmost manipulation sample image in the manipulation sample image display area 522, is displayed in the manipulation result display area 523.

Further, although not illustrated, when the third manipulation sample image from the left in the manipulation sample image display area 521 has been selected, an editing target image, which is obtained such that the color information change processing corresponding to the third manipulation sample image from the left has been applied to the editing target image 523B, instead of the color information change processing corresponding to the fourth manipulation sample image from the left in the manipulation sample image display area 521, is displayed in the manipulation result display area 523.

As described above, only one editing target image (shot image), in which the manipulation processing corresponding to the selected manipulation sample image has been reflected, is displayed in the manipulation result display area 523 in a large manner, every time selection of the manipulation sample image is received. Therefore, the user can select the manipulation content of the image with high flexibility, and can grasp the manipulation content in more detail.

Further, in this state, when the determination button 524 has been operated on the manipulation screen, the manipulation processing for the editing target image is determined. Note that, at this time, a pop-up screen for confirming whether the selected manipulation processing is fine with the user may be displayed and prompt the user to reconfirm.

When the manipulation processing for the editing target image has been determined, in step S106, the editing processing section 302 determines whether the non-manipulation sample image has been selected in each of all of the manipulation sample image display areas, that is, in each of the manipulation sample image display areas 521 and 522.

In step S106, when it has been determined that the non-manipulation sample images have not been selected, the manipulation result of when the determination button 524 is operated is determined as the Keitai Omake, and the processing is terminated.

Meanwhile, in step S106, when it has been determined that the non-manipulation sample images have been selected, the processing proceeds to step S107, and the background selection screen display control section 323 displays a background selection screen. The background selection screen is a screen for selecting a background image to be composited to the background area of the editing target image.

Figure 20:
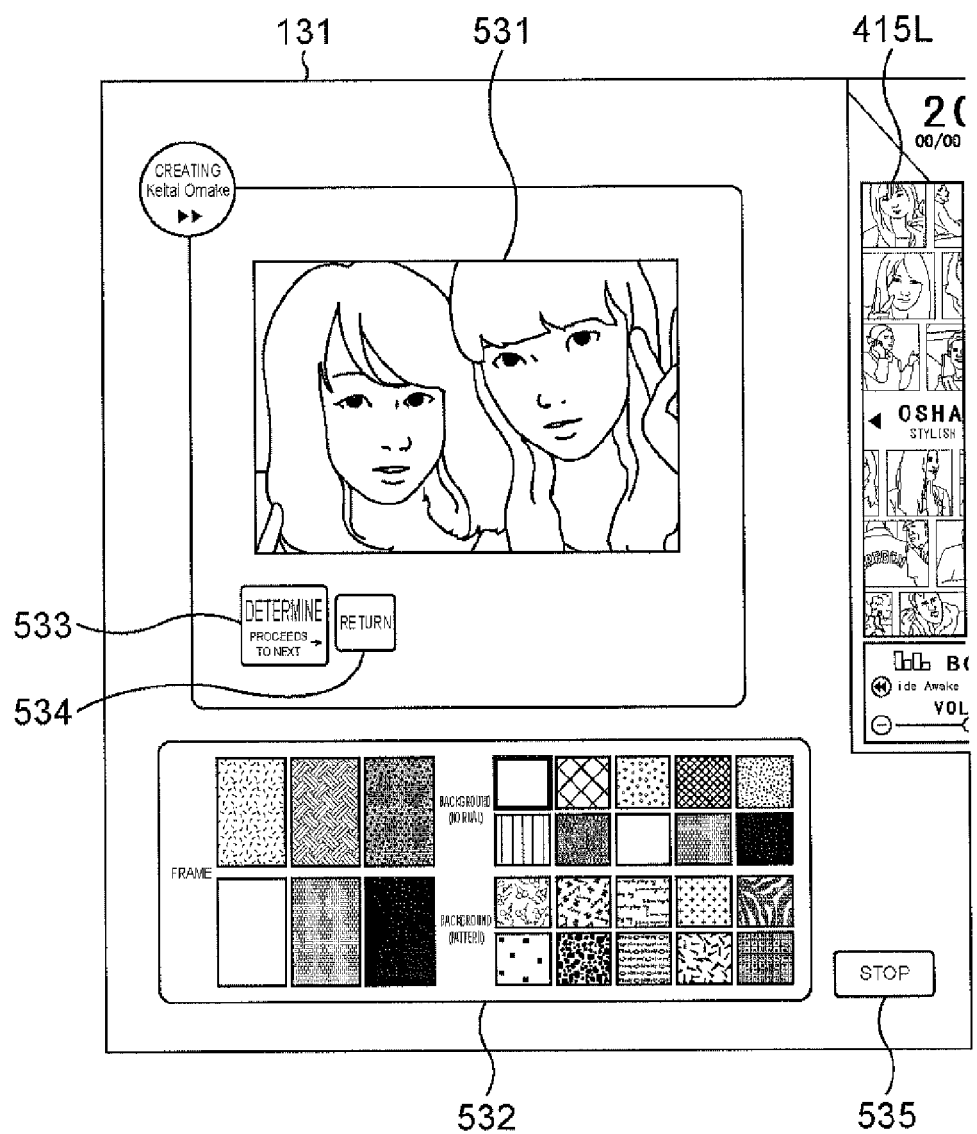
FIG. 20 is a diagram illustrating an example of a background selection screen.

FIG. 20 is a diagram illustrating an example of the background selection screen.

The editing target image is displayed in an editing target image display area 531 on the background selection screen. Note that, in the example of FIG. 20, an image cutout from the shot image with a cut-out frame having the shape of "landscape" is displayed.

In a palette for editing 532 at a lower portion on the background selection screen, frame tools for editing the frame of the editing target image, and the background images for editing the background of the shot image are provided. The user can edit the editing target image by selecting the frame tool and the background image in the palette for editing 532.

A determination button 533 for determining editing content of the editing target image displayed in the editing target image display area 531 and a return button 534 for returning display of the displayed background selection screen to one previous screen (the manipulation screen) are provided at a left side below the editing target image display area 531.

Further, a stop button 535 for terminating the Keitai Omake creation processing is provided on the right side of the palette for editing 532.

When the background image in the palette for editing 532 has been selected on the background selection screen, in step S108, the input receiving section 312 receives the selection of the background image, and the compositing processing section 313 composites the selected background image to the background area of the editing target image displayed in the editing target image display area 531.

Then, when the determination button 533 has been selected, an editing result of that time is confirmed as the Keitai Omake, and the processing is terminated.

As described above, when the shooting is performed with the beauty course, the chroma key shooting for applying the chroma key processing is performed. Therefore, the background image can be composited to the shot image.

Meanwhile, when it is determined that the shooting has not been performed with the beauty course in step S103, that is, when the shooting has been performed with the edgy course in the shooting processing, the processing proceeds to step S109.

In step S109, the manipulation screen is displayed, similarly to step S104. In step S110, selection of the manipulation sample image can be received, similarly to step S105.

Note that, when the shooting has been performed with the edgy course, the shooting not assuming application of the chroma key processing is performed, and thus the background image is not composited to the shot image. Therefore, on the manipulation screen displayed here, the non-manipulation sample images are not displayed in the manipulation sample image display areas 521 and 522, and the background selection screen is not displayed.

Note that, when the stop button 526 has been operated in the middle of the Keitai Omake creation processing on the manipulation screen (FIG. 18), and the Keitai Omake button 416L (or 416R) has been operated again on the editing screen, the manipulation screen displayed again becomes in the default state, regardless of which manipulation sample images have been selected in the manipulation sample image display areas 521 and 522 before the stop button 526 is operated. That is, the operation content up to the operation of the stop button 526 is reset.

According to the above processing, samples of manipulation results of when different variations of manipulation processing are applied to the editing target image (shot image) are displayed in the manipulation sample image display area as the manipulation sample images, and every time selection of the manipulation sample image is received, only one editing target image in which the manipulation processing corresponding to the selected manipulation sample image has been reflected is displayed in the manipulation result display area in a large manner. Therefore, the user can easily select the manipulation content with high flexibility, and the user can easily imagine the finish after manipulation.

Note that, while in the above description, an example in which the Keitai Omake button 416L is operated has been described, the Keitai Omake button 416R is operated at the same time, whereby the Keitai Omake can be created on the right and left editing screens. Especially, when the shooting is performed with the beauty course in the shooting processing, a plurality of types of manipulation processing can be applied to the editing target image on the left-side editing screen, and the background image can be composited to the editing target image on the right-side editing screen, for example.

[Another Example of Keitai Omake Creation Processing]

Next, another example of the Keitai Omake creation processing will be described with reference to the flowchart of FIG. 21.

Figure 16:
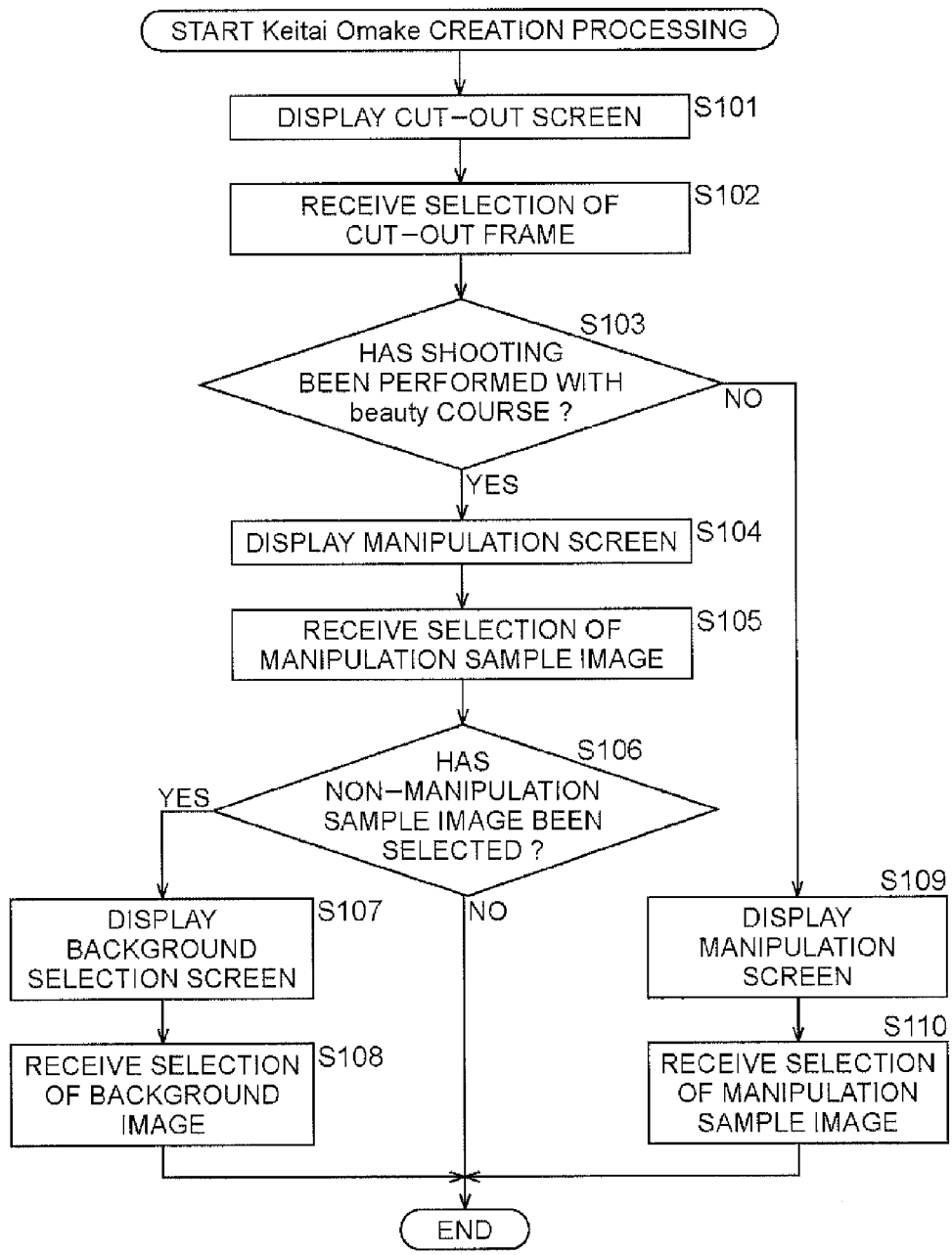
FIG. 16 is a flowchart describing an example of a Keitai Omake creation processing.
Figure 21:
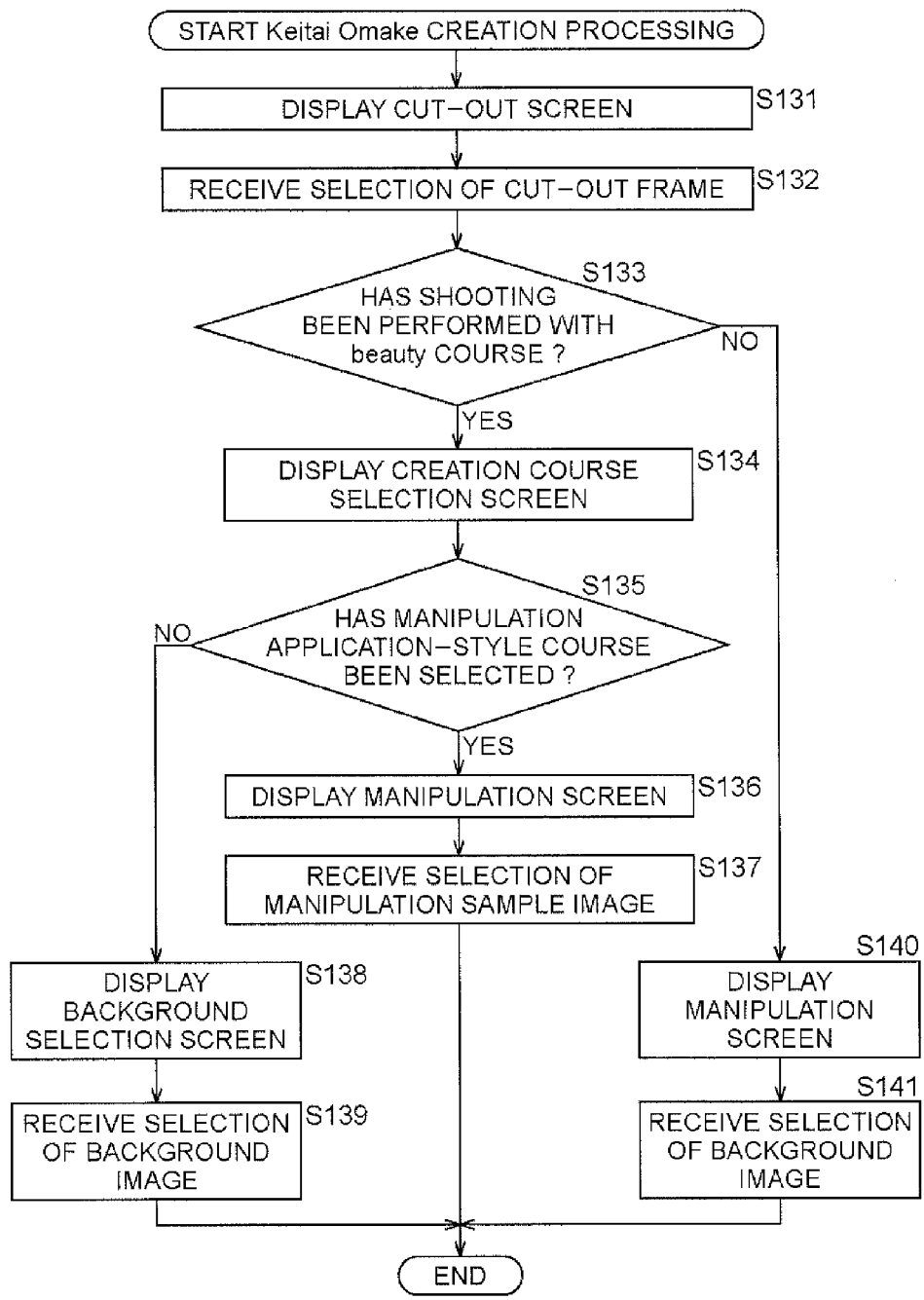
FIG. 21 is a flowchart describing another example of the Keitai Omake creation processing.

Note that processing from steps S131 to S133, and S136 to S141 in the flowchart of FIG. 21 is similar to the processing from steps S101 to S105, and S107 to S110 in the flowchart of FIG. 16, and thus description is omitted.

That is, in step S133, when it has been determined that the shooting has been performed with the beauty course, the processing proceeds to step S134, and the display control section 311 displays a creation course selection screen. The creation course selection screen is a screen for selecting whether the plurality of types of manipulation processing is applied to the shot image in creation of the Keitai Omake.

Figure 22:
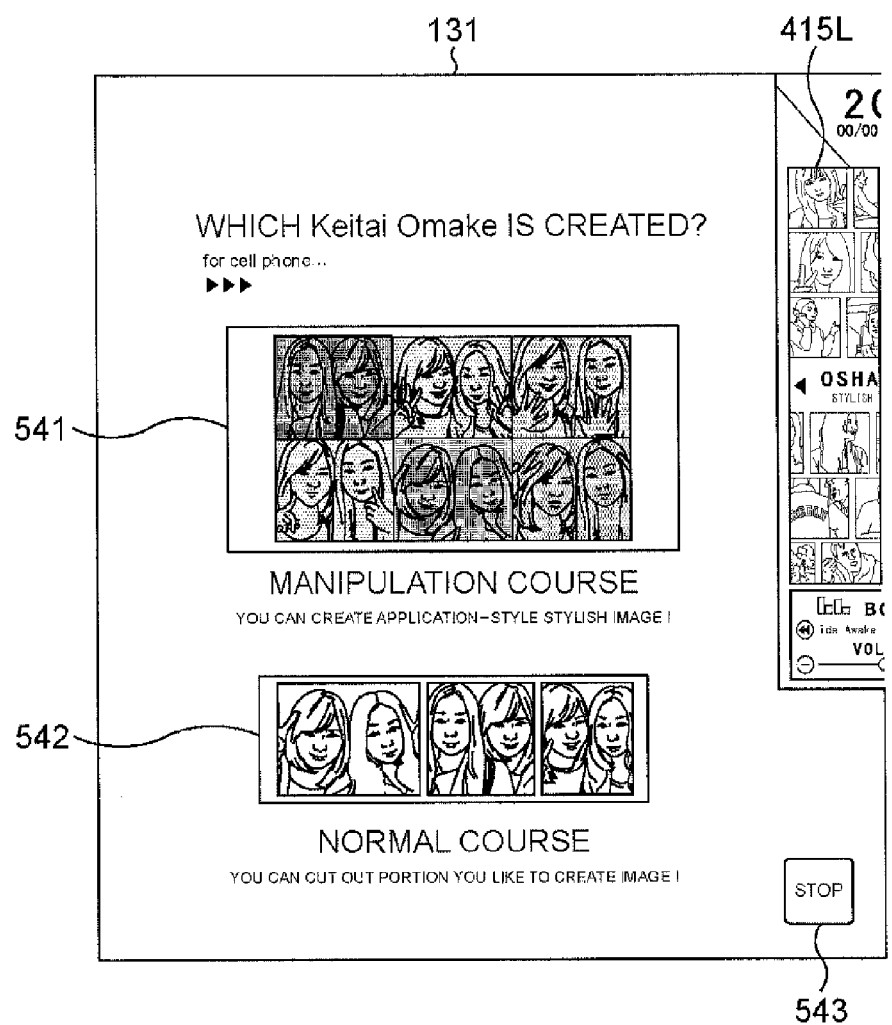
FIG. 22 is a diagram illustrating an example of a creation course selection screen.

FIG. 22 is a diagram illustrating an example of the creation course selection screen.

On the creation course selection screen, a course selection button 541 for selecting a "manipulation course" in which the manipulation processing can be applied to the editing target image, as a creation course, and a course selection button 542 for selecting a "normal course" in which normal editing processing (compositing processing of a background image) can be applied to the editing target image, as a creation course are provided.

In step S135, the editing processing section 302 determines whether the manipulation course has been selected. When it has been determined that the manipulation course has been selected in step S135, that is, when the course selection button 541 has been operated on the creation course selection screen, the processing proceeds to step S136, the manipulation screen described with reference to FIG. 18 is displayed, and selection and determination of the manipulation sample image are performed by the user. Note that, on the manipulation screen displayed here, the non-manipulation sample images are not displayed in the manipulation sample image display areas 521 and 522.

Meanwhile, in step S135, when it has been determined that the manipulation course has not been selected, that is, the course selection button 542 has been operated on the creation course selection screen, the processing proceeds to step S138, the background selection screen described with reference to FIG. 20 is displayed, and selection and determination of the background image are performed by the user.

At this time, a background image different from the background image displayed in the palette for editing display area 414L (414R) on the editing screen (FIG. 15) may be displayed in the palette for editing 532 on the background selection screen. Accordingly, the Keitai Omake can be edited to an image with originality.

Further, the manipulation sample image (layer image) displayed in the manipulation sample image display area 522 may be displayed in the palette for editing 532 on the background selection screen as a foreground image, in addition to the background image. Then, the background image is made corresponding to the texture or the color of the layer image, whereby the editing target image in which the background image and the layer image are composited can have a sense of unity.

Further, in step S133, when it has been determined that the shooting has not been performed with the beauty course, that is, when the shooting has been performed with the edgy course in the shooting processing, the processing proceeds to step S140, the manipulation screen described with reference to FIG. 18 is displayed, and selection and determination of the manipulation sample image are performed by the user.

Note that, as described above, when the shooting has been performed with the edgy course, the shooting not assuming application of the chroma key processing is performed, and thus the background image is not composited to the editing target image. Therefore, the non-manipulation sample images are not displayed in the manipulation sample image display areas 521 and 522 on the manipulation screen displayed here, and the background selection screen is not displayed.

Even in the above processing, operations and effects similar to the Keitai Omake creation processing described with reference to the flowchart of FIG. 16 can be exhibited.

[Modification]

Figure 23:
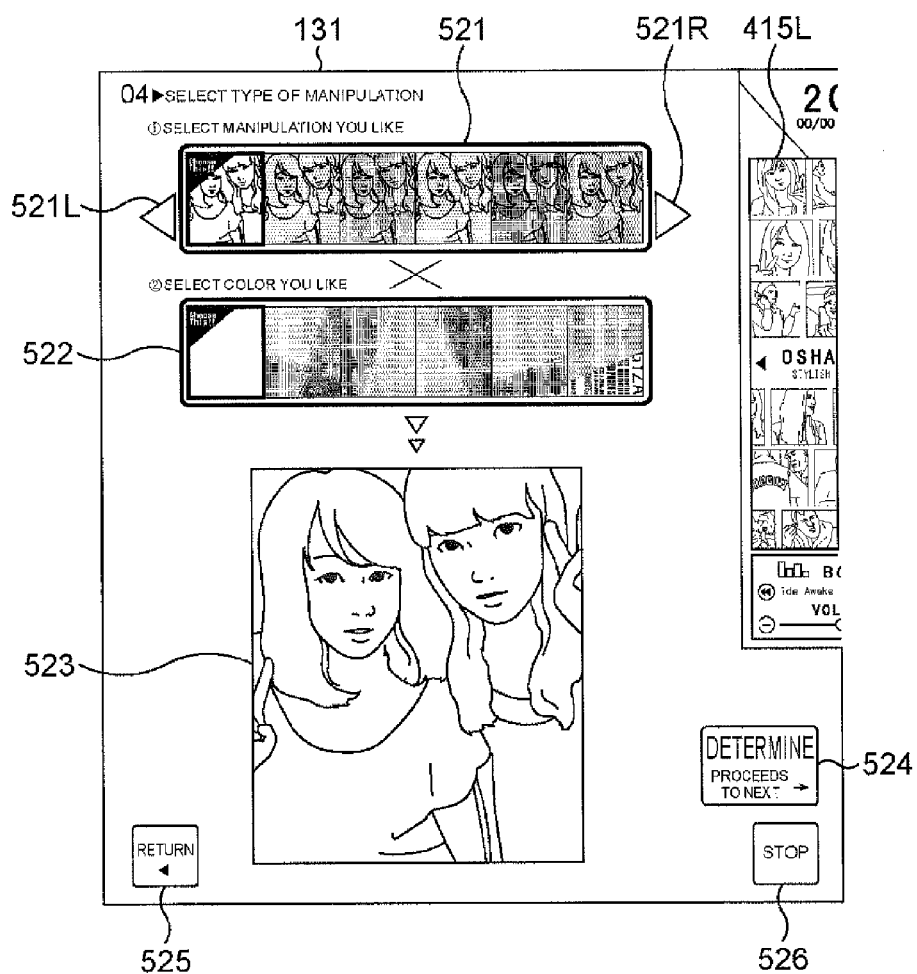
FIG. 23 is a diagram illustrating another example of the manipulation screen.

While in the above description, the manipulation sample image display area 522 is displayed under the manipulation result display area 523 on the manipulation screen of FIG. 18, the manipulation sample image display area 522 may be displayed above the manipulation result display area 523 (under the manipulation sample image display area 521), as illustrated in FIG. 23.

Accordingly, the user can confirm the manipulation sample images displayed in the manipulation sample image display area 521 and the manipulation sample image display area 522 in a range of a closer field of view, and can easily select desired manipulation content.

Figure 24:
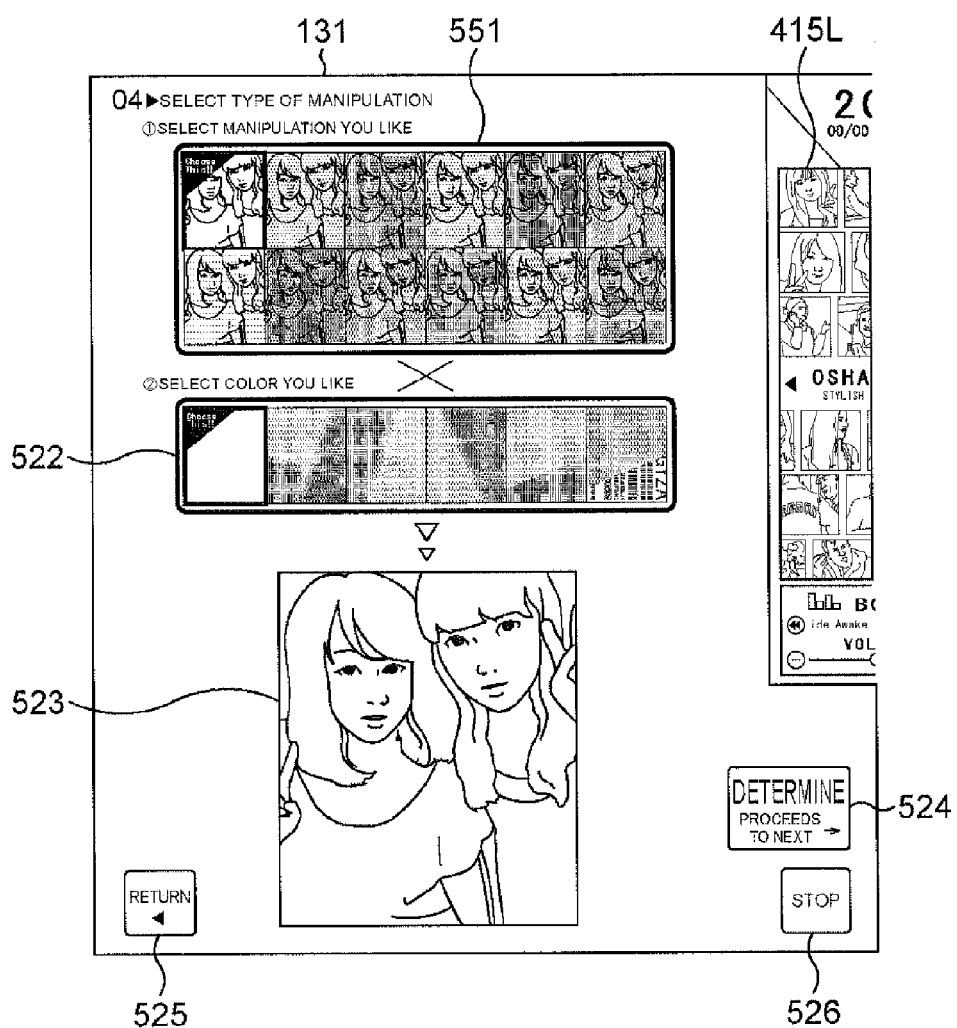
FIG. 24 is a diagram illustrating still another example of the manipulation screen.

Further, on the manipulation screen of FIG. 18, the manipulation sample images displayed in the manipulation sample image display area 521 are shifted to the right and left in the manipulation sample image display area 521 with the operation of the move button 521L or 521R. However, like the manipulation screen of FIG. 24, manipulation sample images corresponding to all variations of the manipulation processing (color information change processing) may be displayed as the manipulation sample images displayed in a manipulation sample image display area 551, for example.

Accordingly, the user can more easily select desired manipulation content with a smaller number of operations.

Further, in the above description, the two types of manipulation processing: the color information change processing and the texture change processing have been described as examples of the manipulation processing applicable in the Keitai Omake creation processing. However, one of the two types of the manipulation processing may be trimming processing (cut-out processing), for example.

Figure 25:
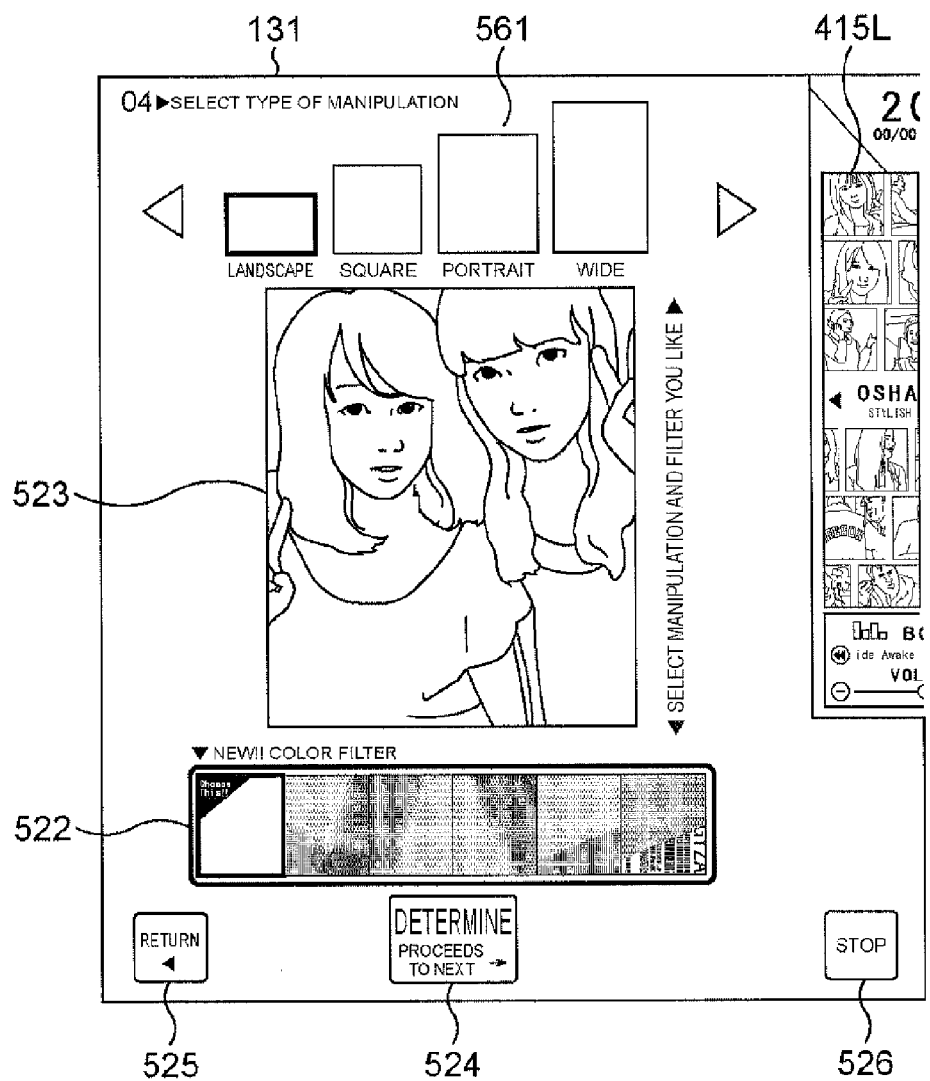
FIG. 25 is a diagram illustrating still another example of the manipulation screen.

For example, on the manipulation screen, a manipulation sample image display area 561 in which samples of trimming shapes in the trimming processing are displayed is provided, as illustrated in FIG. 25, instead of the manipulation sample image display area 521 that serves as samples of the color information change processing. In this case, on the cut-out screen (FIG. 17), only the editing target image display portion 513 is displayed, and the cut-out frame 513A is displayed in the manipulation result display area 523.

Although not illustrated, the manipulation sample image display area 561 may be displayed on the manipulation screen, instead of the manipulation sample image display area 522 that serves as samples of the texture change processing.

Note that, in the above description, when the shooting has been performed with the beauty course in the shooting processing, that is, when the shooting processing section 301 has performed the chroma key shooting for applying the chroma key processing to the shot image, the non-manipulation sample images are displayed on the manipulation screen.

When the shooting processing section 301 has performed the chroma key shooting aside from the above, the trimming processing may not be performed. Contrary to the above, when the shooting processing section 301 has not performed the chroma key shooting, the trimming processing may be performed.

For example, when the shooting has not been performed with the beauty course in the shooting processing, a manipulation screen provided with the manipulation sample image display area 561, in which the samples of trimming shapes in the trimming processing are displayed as illustrated in FIG. 25, is displayed as the manipulation screen. Contrary to the above, when the shooting has been performed with the beauty course, a manipulation screen not provided with the manipulation sample image display area, in which samples of trimming shapes in the trimming processing are displayed, is displayed as the manipulation screen.

Further, when the shooting has not been performed with the beauty course in the shooting processing, the cut-out screen as illustrated in FIG. 17 may be displayed.

[Still Another Example of Keitai Omake Creation Processing]

Here, still another example of the Keitai Omake creation processing will be described with reference to the flowchart of FIG. 26.

Figure 26:
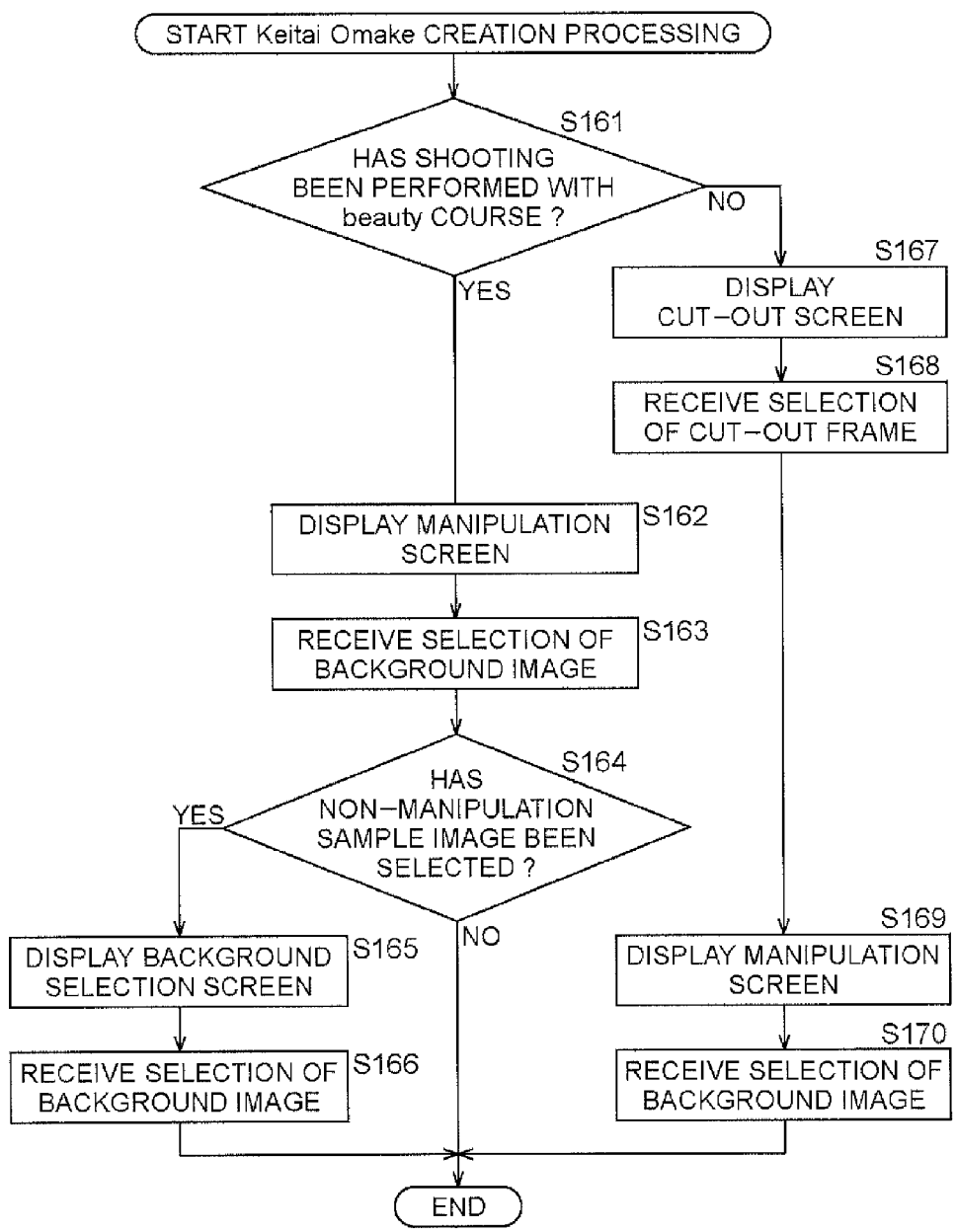
FIG. 26 is a flowchart describing still another example of the Keitai Omake creation processing.

Note that processing of steps S162 to S166, S169, and S170 in the flowchart of FIG. 26 is similar to the processing of steps S104 to S110 in the flowchart of FIG. 16, and thus description is omitted.

That is, in step S161, when it has been determined that the shooting has been performed with the beauty course, the processing proceeds to step S162, and the display control section 311 displays the manipulation screen. Meanwhile, in step S161, when it has been determined that the shooting has not been performed with the beauty course, the processing proceeds to step S167, and the display control section 311 displays the cut-out screen, and the input receiving section 312 receives selection of the cut-out frame.

As described above, when the shooting has not been performed with the beauty course in the shooting processing, the cut-out screen may be displayed and the trimming processing may be performed.

Further, three types or more of the manipulation processing may be applied as the manipulation processing applicable in the Keitai Omake creation processing. In this case, totally different types of the manipulation processing may be applied, or the three types of the manipulation processing may be prepared such that the color information change processing is divided into two categories or the texture change processing is divided into two categories, of the above-described two types of the manipulation processing. Further, processing of changing the size or the brightness of the eyes of the user (object) in the shot image, which has been applied in advance in the shooting processing, may be applied again as the manipulation processing.

Note that the selection of the manipulation processing may be performed not only in the Keitai Omake creation processing, but also in the pre-service processing, the shooting processing, or the post-service processing, in which an image in which a person appears is displayed.

For example, when selection of the manipulation processing is performed in the shooting processing, the selected manipulation processing is applied to a live view (moving image) displayed on the touch panel monitor 92, whereby the user can easily imagine the finish after manipulation and perform the shooting, while confirming the live view that is the manipulation result of the manipulation processing.

[Configuration Example of Shooting Processing Section]

Figure 27:
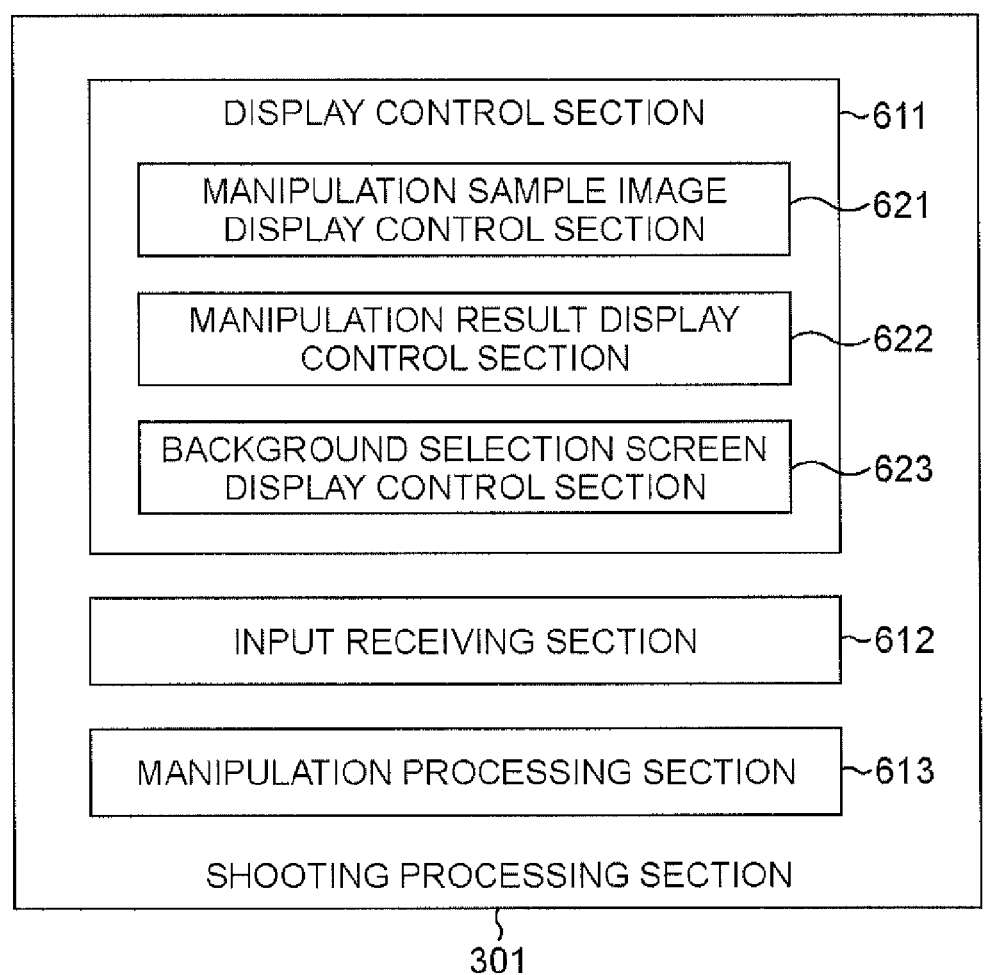
FIG. 27 is a block diagram illustrating a functional configuration example of a shooting processing section.

FIG. 27 is a block diagram illustrating a functional configuration example of the shooting processing section 301 of when the selected manipulation processing is applied to the live view. In this case, the photo sticker creating device 1 functions as a photo decoration device by an operation of the shooting processing section 301.

The shooting processing section 301 is configured from a display control section 611, an input receiving section 612, and a manipulation processing section 613.

The display control section 611 controls display of the touch panel monitor 92 in the shooting section 208.

The input receiving section 612 receives an operation input to the touch panel monitor 92.

The manipulation processing section 613 applies various types of manipulation processing to the live view according to an instruction of the user, at the time of displaying the live view.

Further, the display control section 611 includes a manipulation sample image display control section 621, a manipulation result display control section 622, and a background selection screen display control section 623.

The manipulation sample image display control section 621 displays a manipulation sample image group made of a plurality of manipulation sample images corresponding to the manipulation processing applied to the live view for each type of the manipulation processing, at the time of displaying the live view.

Here, when any one of the manipulation sample images has been selected, the input receiving section 612 receives the selection of the one manipulation sample image, and the manipulation processing section 613 applies the manipulation processing applied to the manipulation sample image, the selection of which has been received, to the live view.

The manipulation result display control section 622 then displays the live view subjected to the manipulation processing in a live view display area displayed on the screen.

Further, the background selection screen display control section 623 displays a background selection screen for selecting a background image to be composited to the background area of the live view according to an instruction of the user, at the time of displaying the live view.

[Details of Live View Display Processing]

Figure 28:
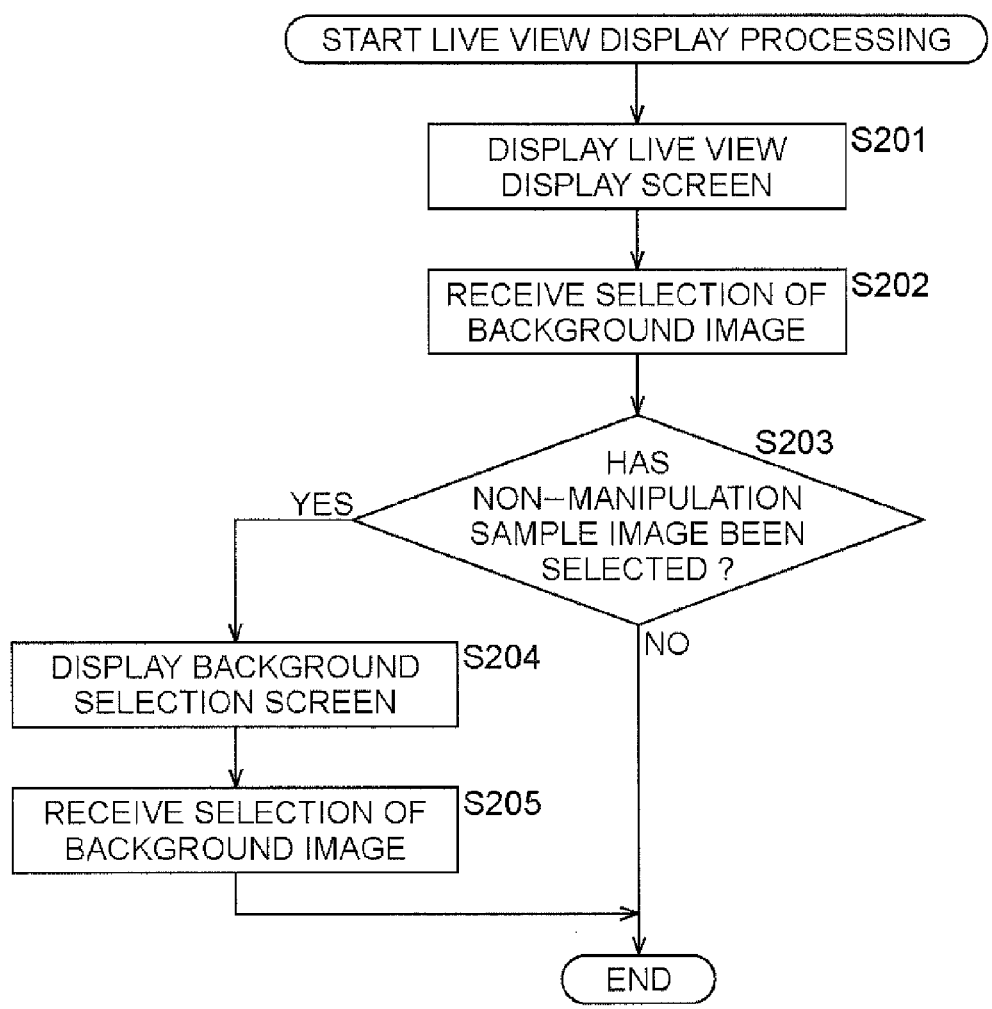
FIG. 28 is a flowchart describing an example of live view display processing.

Next, live view display processing executed in the shooting processing will be described with reference to the flowchart of FIG. 28.

In step S201, the display control section 611 causes the touch panel monitor 92 to display a live view display screen.

FIG. 29 is a diagram illustrating an example of the live view display screen.

Note that, on the live view display screen, manipulation sample image display areas 631 and 632 have similar functions to the respective manipulation sample image display areas 521 and 522 described with reference to FIG. 18, and the like, and thus description is omitted. In the example of FIG. 29, a live view display area 633 for displaying the live view is provided between the manipulation sample image display area 631 and the manipulation sample image display area 632.

When any of the manipulation sample images has been selected by the user in each of the manipulation sample image display areas 631 and 632, in step S202, the input receiving section 612 receives the selection of the manipulation sample images, and the manipulation processing section 613 applies the manipulation processing corresponding to the manipulation sample images, the selections of which have been received, to the live view displayed in the live view display area 633.

Then, in this state, when a determination button 624 has been operated on the manipulation screen, the manipulation processing for the shot image obtained by the shooting is determined.

When the manipulation processing for the shot image has been determined, in step S203, the shooting processing section 301 determines whether the non-manipulation sample images have been selected in all of the manipulation sample image display areas, that is, in the respective manipulation sample image display areas 631 and 632.

In step S203, when it has been determined that the non-manipulation sample images have not been selected, the manipulation processing of when the determination button 624 has been operated is determined, and the processing is terminated.

Meanwhile, in step S203, when it has been determined that the non-manipulation sample images have been selected, the processing proceeds to step S204, and the background selection screen display control section 633 displays a background selection screen similar to FIG. 20.

When the background image has been selected on the background selection screen, in step S205, the input receiving section 612 receives the selection of the background image, and the background image of when the determination button has been operated is determined as the background image composited to the shot image obtained by the shooting, and the processing is terminated.

According to the above processing, in the manipulation sample image display area, the samples of the manipulation results of when the different variations of the manipulation processing are applied to the live view are displayed as the manipulation sample images, and in the live view display area, the live view in which the manipulation processing corresponding to the selected manipulation sample image is reflected is displayed, every time selection of the manipulation sample image is received. Therefore, the user can easily select the manipulation content with high flexibility, and can easily imagine the finish after manipulation.

Further, in the above description, the selected manipulation processing is applied to the entire shot image. However, the selected manipulation processing may be applied only to an area in the shot image, which has been selected by the user. For example, when a plurality of users appears in the shot image, a contour of a specific person area is traced or a part of the person area is tapped, with the touch pen 132A (132B), so that the selected manipulation processing is applied only to the person area. Note that the person area may be recognized by person recognition processing. Further, the manipulation processing may be applied only to an area other than the person area, that is, a background area, or an image for compositing area to which the image for compositing is composited.

Note that, in the above-described embodiment, the photo sticker creating device 1 has a configuration to print the shot image obtained by shooting and the edited image on the sticker sheet, and to transmit the images to the server, thereby to provide the images to the mobile terminal of the user. However, the photo sticker creating device 1 may employ a configuration only to transmit the shot image and the edited image to the server, thereby to provide the images to the mobile terminal of the user without printing the images on the sticker sheet. To the contrary, the photo sticker creating device 1 may employ a configuration only to print the shot image and the edited image on the sticker sheet without transmitting the images to the server.

The above-described series of processing can be executed by hardware or can be executed by software. When the series of processing is executed by software, a program that configures the software is installed from a network or a recording medium.

The recording medium is configured from, as illustrated in FIG. 10, separately from the main body of the device, not only the removable medium 205 formed of a magnetic disk (including a flexible disk), an optical disk (including a CD-ROM and a DVD), a magneto-optical disk, or semiconductor memory, in which the program is recorded, and which is distributed for delivering the program to an administrator of the photo sticker creating device 1, but also the ROM 206 or a hard disk included in the storage section 202, in which the program is recorded, and which is distributed to the administrator in a state of being incorporated in the main body of the device in advance.

Note that, in the present specification, the steps describing the program recorded in the recording medium include not only the processing performed along the described order in time series, but also the processing executed in parallel or separately executed, even if not necessarily processed in time series.

In the above, the print medium is not limited to a sticker sheet and a photograph sheet. For example, the images may be printed on a sheet or a film having a predetermined size, a sheet for poster, a card such as a telephone card, or cloth such as a T-shirt, or the like.

Further, embodiments of the present invention are not limited to the above-described embodiments, and various changes can be made without departing from the gist of the present invention.

What is claimed is:

1. A photo decoration device comprising:
a shooting processing section configured to shoot a user as an object;
an editing processing section configured to allow the user to edit a shot image obtained by shooting;
an input receiving section configured to receive, a plurality of times, selection of manipulation processing to be applied to the entire shot image;
a manipulation processing section configured to generate, when the selection of manipulation processing has been received this time, an image after manipulation processing that is the entire shot image to which the manipulation processing received this time is applied over the manipulation processing, selection of which has been received previous time;

a manipulation sample image display control section configured to simultaneously display, on different areas of a manipulations screen, the shot image together with a manipulation sample image group composed of a plurality of manipulation sample images that serve as samples of manipulation results of different manipulation processing of the shot image and also composed of a non-manipulation sample image not corresponding to any of the manipulation processing, for each type of manipulation processing, wherein the manipulation sample image group includes a plurality of manipulation sample image groups of different types; and a background selection screen display control section configured to display a background selection screen for selecting a background image to be composited to a background area of the shot image in response to selection of the non-manipulation sample image being received in all types of the manipulation sample image groups, wherein:

the input receiving section receives the selection of manipulation processing corresponding to the manipulation sample image selected in the manipulation sample image group, and the manipulation processing section generates, when a first type of manipulation processing that is selected this time is different from a second type of manipulation processing that has already been applied to the shot image, the image after manipulation processing that is the entire shot image to which the first type of manipulation processing is applied in addition to the second type of manipulation processing, wherein both the first type of manipulation processing and the second type of manipulation processing are applied to the entire shot image.

2. The photo decoration device according to claim 1, wherein
the manipulation processing section generates the image after manipulation processing to which variations of the manipulation processing, selection of which has been received, is applied.

3. The photo decoration device according to claim 1, wherein
the manipulation sample image display control section displays a plurality of the manipulation sample images arranged in a predetermined direction in the manipulation sample image group with predetermined staging according to an operation of the user.

4. The photo decoration device according to claim 1, wherein
the first type of manipulation processing includes a processing for the entire shot image to have a predetermined texture, and the second type of processing includes changing color information of the entire shot image.

5. The photo decoration device according to claim 1, wherein
the shooting processing section shoots the user as an object in a shooting space, and
the editing processing section allows the user to edit the shot image in an editing space different from the shooting space.

6. The photo decoration device according to claim 1, further comprising:
a transmission processing section configured to transmit the image after manipulation processing to a mobile terminal through a server.

7. A photo decoration device comprising:
a shooting processing section configured to shoot a user as an object;
an editing processing section configured to allow the user to edit a shot image obtained by shooting;
a manipulation sample image display control section configured to simultaneously display, on different areas of a manipulations screen, the shot image together with a manipulation sample image group composed of a plurality of manipulation sample images that serve as samples of manipulation results of different manipulation processing of the shot image, which is applied to the entire shot image, and also composed of a non-manipulation sample image not corresponding to any of the manipulation processing, the different manipulation sample images according to whether the shooting processing section has performed chroma key shooting for applying chroma key processing to the shot image, wherein the manipulation sample image group includes a plurality of manipulation sample image groups of different types;
an input receiving section configured to receive, a plurality of times, selection of the manipulation processing corresponding to the selected manipulation sample image;
a manipulation processing section configured to generate, when the selection of the manipulation processing has been received this time, an image after manipulation processing that is the entire shot image to which the manipulation processing received this time is applied over the manipulation processing, selection of which has been received previous time; and
a background selection screen display control section configured to display a background selection screen for selecting a background image to be composited to a background area of the shot image in response to selection of the non-manipulation sample image being received in all types of the manipulation sample image groups, wherein:
the manipulation processing section generates, when a first type of manipulation processing that is selected this time is different from a second type of manipulation processing that has already been applied to the shot image, the image after manipulation processing that is the entire shot image to which the first type of manipulation processing is applied in addition to the second type of manipulation processing, wherein both the first type of manipulation processing and the second type of manipulation processing are applied to the entire shot image.

8. The photo decoration device according to claim 7, wherein
the manipulation processing section applies the manipulation processing including processing of trimming an image with a predetermined shape to the entire shot image when the shooting processing section has not performed the chroma key shooting.

9. The photo decoration device according to claim 7, wherein
the manipulation sample image display control section displays a plurality of the manipulation sample images arranged in a predetermined direction with predetermined staging according to an operation of the user.

10. The photo decoration device according to claim 7, wherein
the first type of manipulation processing includes a processing for the entire shot image to have a predetermined texture, and the second type of processing includes changing color information of the entire shot image.

11. The photo decoration device according to claim 7, wherein
the shooting processing section shoots the user as an object in a shooting space, and
the editing processing section allows the user to edit the shot image in an editing space different from the shooting space.

12. The photo decoration device according to claim 7, further comprising:
a transmission processing section configured to transmit the image after manipulation processing to a mobile terminal through a server.

13. A photo decoration device comprising:
a shooting processing section configured to shoot a user as an object;
an editing processing section configured to allow the user to edit a shot image obtained by shooting;
an input receiving section configured to receive, a plurality of times, selection of manipulation processing to be applied to the entire shot image;
a manipulation processing section configured to generate, when the selection of manipulation processing has been received this time, an image after manipulation processing that is an entire live view image captured at shooting to which the manipulation processing received this time is applied over the manipulation processing, selection of which has been received previous time;
a manipulation sample image display control section configured to simultaneously display, on different areas of a manipulations screen, the shot image together with a manipulation sample image group composed of a plurality of manipulation sample images that serve as samples of manipulation results of different manipulation processing of the shot image and also composed of a non-manipulation sample image not corresponding to any of the manipulation processing, for each type of manipulation processing, wherein the manipulation sample image group includes a plurality of manipulation sample image groups of different types; and
a background selection screen display control section configured to display a background selection screen for selecting a background image to be composited to a background area of the shot image in response to selection of the non-manipulation sample image being received in all types of the manipulation sample image groups, wherein:
the input receiving section receives the selection of manipulation processing corresponding to the manipulation sample image selected in the manipulation sample image group, and
the manipulation processing section generates, when a first type of manipulation processing that is selected this time is different from a second type of manipulation processing that has already been applied to the shot image, the image after manipulation processing that is the entire shot image to which the first type of manipulation processing is applied in addition to the second type of manipulation processing, wherein both the first type of manipulation processing and the second type of manipulation processing are applied to the entire shot image.

14. The photo decoration device according to claim 13, wherein
the first type of manipulation processing includes a processing for the entire shot image to have a predetermined texture, and the second type of processing includes changing color information of the entire shot image.

15. The photo decoration device according to claim 13, wherein
the shooting processing section shoots the user as an object in a shooting space, and
the editing processing section allows the user to edit the shot image in an editing space different from the shooting space.

16. The photo decoration device according to claim 13, further comprising:
a transmission processing section configured to transmit the image after manipulation processing to a mobile terminal through a server.

* * * * *